United States Patent
Kloos et al.

(10) Patent No.: US 6,873,614 B2
(45) Date of Patent: Mar. 29, 2005

(54) DIGITAL COMMUNICATION SYSTEM HAVING IMPROVED COLOR CODE CAPABILITY

(75) Inventors: Michael N. Kloos, Belvidere, IL (US); Michael S. Palac, Mt. Prospect, IL (US); Mark Marsan, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 226 days.

(21) Appl. No.: 10/326,353

(22) Filed: Dec. 19, 2002

(65) Prior Publication Data

US 2004/0120303 A1 Jun. 24, 2004

(51) Int. Cl.⁷ .............................................. H04B 7/212
(52) U.S. Cl. ........................................ 370/347; 370/350
(58) Field of Search ........................... 370/328, 329, 370/337, 336, 341, 347, 350, 431, 442, 503, 509, 510, 512, 513, 514; 375/261, 278, 254, 354, 364–366

(56) References Cited

U.S. PATENT DOCUMENTS

| | | | |
|---|---|---|---|
| 4,025,853 A | 5/1977 | Addeo | |
| 5,241,545 A * | 8/1993 | Kazecki et al. | 370/337 |
| 5,280,472 A | 1/1994 | Gilhousen et al. | |
| 5,448,759 A | 9/1995 | Krebs et al. | |
| 5,519,730 A | 5/1996 | Jasper et al. | |
| 5,548,631 A | 8/1996 | Krebs et al. | |
| 6,256,304 B1 * | 7/2001 | Vayrynen | 370/350 |
| 6,308,072 B1 | 10/2001 | Labedz et al. | |
| 6,337,985 B1 | 1/2002 | Roux et al. | |
| 6,463,047 B1 * | 10/2002 | Cui et al. | 370/337 |

* cited by examiner

*Primary Examiner*—Ajit Patel

(57) ABSTRACT

A time division multiple access communication system is provided having multiple sub-channels according to known quadrature amplitude modulation techniques. Each sub-channel has a pre-determined time duration and is divided by a pre-determined number of symbol position time divisions. The symbol positions carry sync, pilot and data symbols. Color code information is incorporated into the sync and pilot symbols. The QAM constellation value of the sync symbol is mapped to a color code value. In addition, the sync symbol carries a color code extension which enlarges the color code space.

20 Claims, 22 Drawing Sheets

| 502 | 504 | 506 | 508 | |
|---|---|---|---|---|
|  |  |  |  |  |
|  |  |  |  |  |
|  |  |  |  |  |
|  |  |  |  |  |
| 520 | 520 | 520 | 520 | 0 |
| 520 | 520 | 520 | 520 |  |
| 520 | 520 | 520 | 520 |  |
| 524 | 524 | 522 |  |  |
|  |  |  |  |  |
| 526 |  |  | 526 | 5 |
|  |  |  |  |  |
| 530 |  |  |  |  |
| 530 |  |  |  |  |
| 530 | 526 | 526 |  |  |
|  |  |  |  |  |
|  |  |  |  |  |
|  |  |  |  |  |
| 526 |  |  | 526 | 13 |
|  |  |  |  |  |
|  |  |  |  |  |
|  |  |  |  |  |
|  | 526 | 526 | 530 |  |
|  |  |  | 530 |  |
|  |  |  | 530 |  |
| 526 |  |  | 526 | 21 |
|  |  |  |  |  |
|  |  |  |  |  |
|  |  |  |  |  |
|  | 526 | 526 |  |  |
|  |  |  |  |  |
|  |  |  |  |  |
|  |  |  |  |  |
| 526 |  |  | 526 | 29 |

FIG. 9

| | | | | |
|---|---|---|---|---|
| | | | | 30 |
| | | | | |
| | | | | |
| | 526 | 526 | | |
| | | | | |
| | | | | |
| | | | | |
| 526 | | | 526 | 37 |
| | | | | |
| | | | | |
| 530 | | | | |
| 530 | 526 | 526 | | |
| 530 | | | 530 | |
| | | | 530 | |
| | | | 530 | |
| 526 | | | 526 | 45 |
| | | | | |
| | | | | |
| | | | | |
| | 526 | 526 | | |
| | | | | |
| | | | | |
| | | | | |
| 526 | | | 526 | 53 |
| | | | | |
| | | | | |
| | | | | |
| | 526 | 526 | | |
| | 522 | 524 | 524 | 59 |
| 520 | 520 | 520 | 520 | |
| 520 | 520 | 520 | 520 | |
| 520 | 520 | 520 | 520 | |
| | | | | |
| | | | | |
| 502 | 504 | 506 | 508 | |

*FIG. 10*

| 502 | 504 | 506 | 508 | |
|---|---|---|---|---|
| | | | | |
| | | | | |
| | | | | |
| | | | | |
| 520 | 520 | 520 | 520 | 0 |
| 520 | 520 | 520 | 520 | |
| 520 | 520 | 520 | 520 | |
| 524 | 524 | | | |
| | 522 | 522 | | |
| 526 | | | 526 | 5 |
| | | | | |
| | | | | |
| | | | | |
| 530 | 526 | 526 | | |
| 530 | | | | |
| 530 | | | | |
| | | | | |
| 526 | | | 526 | 13 |
| | | | | |
| | | | | |
| | | | 530 | |
| | 526 | 526 | 530 | |
| | | | 530 | |
| | | | | |
| | | | | |
| 526 | | | 526 | 21 |
| | | | | |
| | | | | |
| | | | | |
| | 526 | 526 | | |
| | | | | |
| | | | | |
| | | | | |
| 526 | | | 526 | 29 |

*FIG. 13*

| 502 | 504 | 506 | 508 | |
|---|---|---|---|---|
| | | | | 30 |
| | | | | |
| | | | | |
| | 526 | 526 | | |
| | | | | |
| | | | | |
| | | | | |
| 526 | | | 526 | 37 |
| | | | | |
| | | | | |
| | | | | |
| 530 | 526 | 526 | | |
| 530 | | | 530 | |
| 530 | | | 530 | |
| 526 | | | | |
| | | | 526 | 45 |
| | | | | |
| | | | | |
| | | | | |
| | 522 | 522 | | |
| | | | | |
| | | | | |
| | | | | |
| 526 | | | 526 | 53 |
| | | | | |
| | | | | |
| | 524 | 524 | | |
| | | | | |
| | | | | 59 |

*FIG. 14*

| | | | | |
|---|---|---|---|---|
| | | | | 30 |
| | | | | |
| | | | | |
| | | | | |
| | | | | |
| | | | | |
| | | | | |
| 526 | | | 526 | 37 |
| | | | | |
| | | | | |
| | | | | |
| | 526 | 526 | | |
| | | | | |
| | | | | |
| | | | | |
| 526 | | | 526 | 45 |
| | | | | |
| | | | | |
| | | | | |
| | 526 | 526 | | |
| | | 524 | 524 | 51 |
| 526 | 526 | 526 | 526 | 52 |
| | | | | |
| | | | | |
| | | | | |
| | | | | |
| | | | | |
| | | | | |
| | | | | |
| | | | | |
| | | | | |
| | | | | |

*FIG. 18*

DIGITAL COMMUNICATION SYSTEM HAVING IMPROVED COLOR CODE CAPABILITY

BACKGROUND OF THE INVENTION

1. Field of the Invention

The present invention pertains to digital communication systems and in particular to wireless digital communication systems which use embedded time-domain pilots and color codes.

2. Description of the Related Art

BRIEF DESCRIPTION OF THE DRAWINGS

FIGS. 9 and 10 together comprise a top plan view thereof, taken on an enlarged scale;

FIGS. 13 and 14 together comprise a top plan view thereof taken on an enlarged scale;

FIGS. 17 and 18 together comprise a top plan view thereof, taken on an enlarged scale;

DETAILED DESCRIPTION OF THE PREFERRED EMBODIMENT

Figure 1:
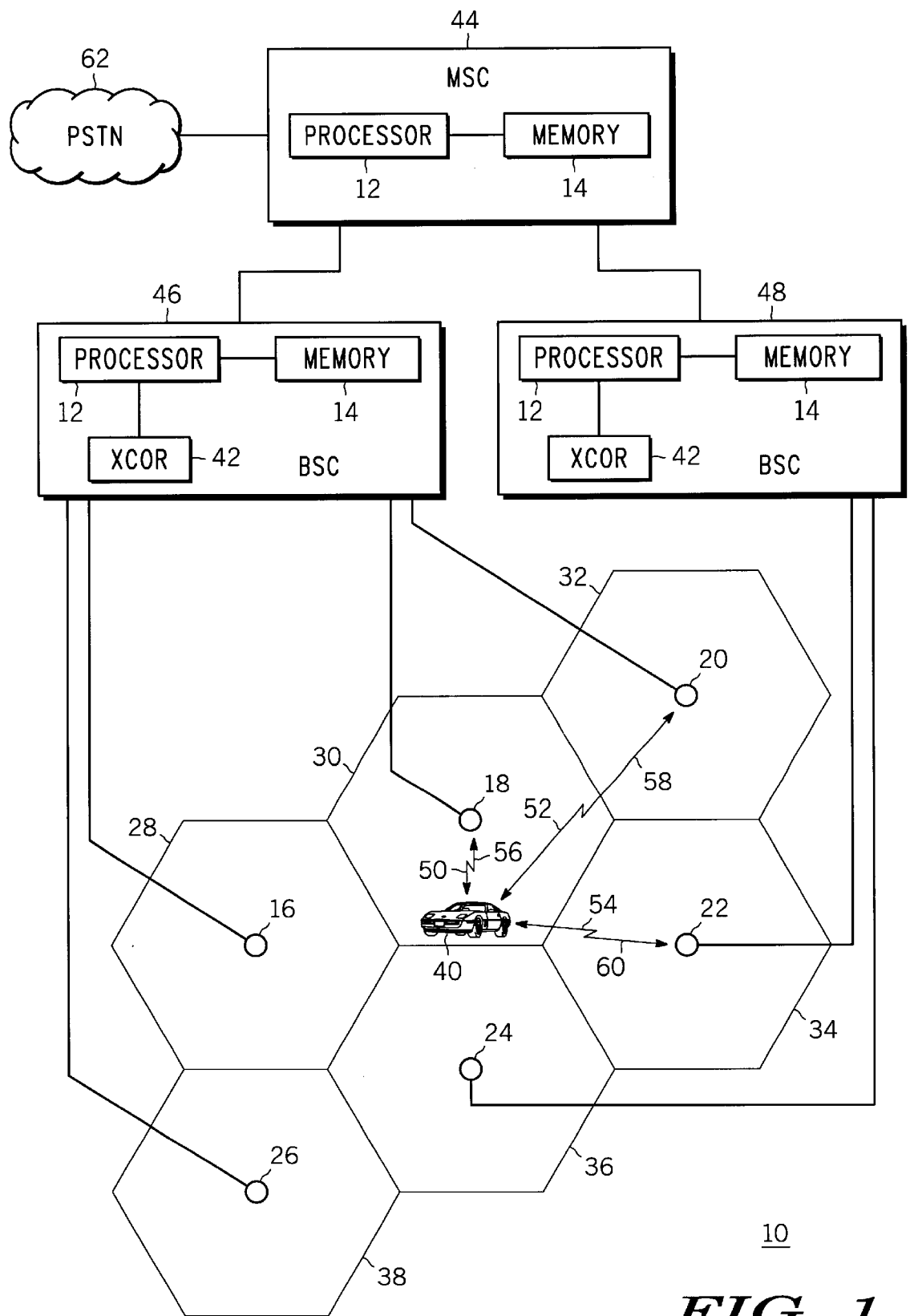
FIG. 1 is a schematic diagram of a wireless communication system in accordance with the preferred embodiment of the present invention.

The present invention pertains to wireless communication systems and in particular to inbound and outbound digital TDMA communication systems. Referring to the drawings, FIG. 1 illustrates a wireless communication system 10, such as a time division multiple access (TDMA) digital radiotelephone system. Fixed communication units such as base transceiver stations (BTS) 16, 18, 20, 22, 24, and 26, also referred to as cells, communicate with a mobile station 40, also referred to as a mobile unit, operating within area 30. Areas 28, 30, 32 and 38 are served by BTSs 16, 18, 20 and 26 respectively, while areas 34 and 36 are served by BTSs 22 and 24. BTSs 16, 18, 20 and 26 are coupled to a base station controller (BSC) 46, which includes, among other things, a transcoder (XCDR) 42, a processor 12, and a memory 14, and which is in turn coupled to a mobile switching center (MSC) 44, also including a processor 12, and a memory 14. Similarly, BTSs 22 and 24 are coupled to BSC 48 which includes, among other things, a XCDR 42, a processor 12, and a memory 14, and which in turn is also coupled to MSC 44. BSCs 46 and 48 may be referred to as a base station subsystem (BSS). A BSS may also be defined as a single BSC and its associated BTSs. MSC 44 is coupled to the public switched telephone network (PSTN) 62. The PSTN, MSC, and BSS are generically referred to as the infrastructure.

Wireless communication between BTSs 16, 18, 20, 22, 24, and 26 and mobile unit 40 occurs via radio frequency (RF) channels which provide physical paths over which digital communication signals such as voice and data are transmitted. Base-to-mobile unit communications are said to occur on a forward link, while mobile-to-base unit communications are referred to as being on a reverse link.

As shown in FIG. 1, a communication signal 50 has been transmitted on the forward link channel such as a traffic channel, by base station 18 to mobile station 40. Additionally, a communication signal 56 has been transmitted on a reverse link channel such as a traffic channel by mobile station 40 in response to communication signal 50 from base station 18.

Wireless communication system 10 provides a number of logical channels (not shown) that are separated into two categories, traffic channels and signaling channels. The signaling channels are intended for carrying signaling information for broadcast control, mobile unit access control, synchronization, and mobility management. The traffic channels are intended for carrying encoded network data, but also support signaling for mobile station management. The mobile station management signaling on the traffic channel will either steal network data frames or will reduce the throughput of network data frames on the traffic channel, so the frequency of these transmissions is very low.

Basically, color code protection is employed to differentiate between two or more users whose communications interfere with one another, to some extent. Typically, color code systems are relied upon to protect system operation where communication frequencies are reused in different relatively close operational areas, such as wireless telephone cells. The present invention has found immediate application in a Time Division Multiple Access (TDMA) communication system, such as the "iDEN" system commercially available from Motorola, Inc., of Schaumburg, Ill. The Motorola "iDEN" system combines the capabilities of digital dispatch and digital cellular interconnect into a single system. The system utilizes an advanced 16--QAM modulation technology that conveys either three or six communication circuits into a single 25 kHz RF channel. Each frequency (or group of frequencies) is arranged in a cellular pattern such as that illustrated in FIG. 1. For example, cells 28, 36 and 38 operate at frequency 1, frequency 2 and frequency 3, respectively. Nearby cell 34 could be assigned frequency 1, the same frequency as that used in non-contiguous cell 28. As depicted in FIG. 1, the cellular areas of operation designated by numerals 28 and 34 are separated by cell 36. Usually, the spatial separation is sufficient to prevent interference between the co-channels 28 and 34. However, due to conditions of terrain and weather interference between cells 28 and 34 can arise, especially in relatively dense communications areas, such as major metropolitan centers. In order to avoid costly capital investment to address random occurrences of interference, systems of color code protections have been devised to distinguish potential co-channel interferes. With the color code systems in place, interfering users in cells 28 and 34 which operate on the same frequencies and have other indistinguishable systems characteristics can nonetheless be differentiated by different color code values associated with their systems operation. FIGS. 2–5 show an example of such systems operation.

Figure 2:
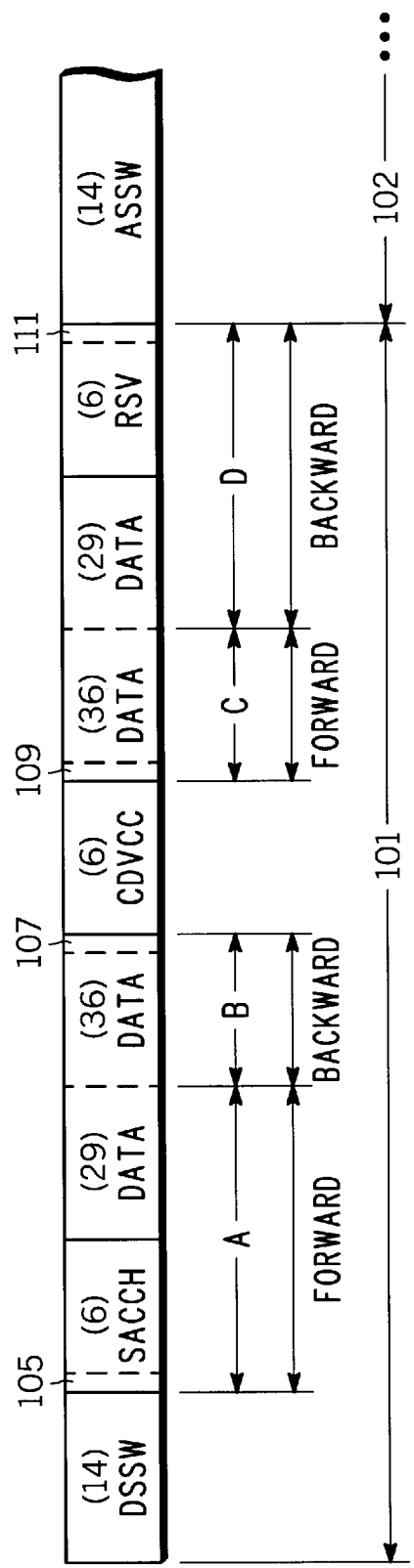
FIG. 2 is illustrates the format for a data packet in the system of FIG. 1.

Referring now to FIGS. 2–5, an example of color code protection in a TDMA system will be described. FIG. 2, shows a format for a data packet 101 in a TDMA system. A receiver 202 (shown in FIG. 3) selectively receives digital information transmitted from a remote signal source 204. The digital information includes a plurality of symbols. A predetermined number of symbols form a data packet 101 having information intended for the receiver 202.

In the TDMA system, the data packet 101 includes one codeword providing synchronization, a desired time slot sync word (DSSW), and a coded digital voice color code (CDVCC). A second data packet 102 adjacent to the data packet 101 also has a codeword for synchronization designated as the adjacent time slot sync word (ASSW) because of its location to the data packet 101.

The data packet 101 is divided into four regions (A, B, C and D) for symbol recovery, each region (A, B, C and D) is adjacent to one of the three codewords. The symbols in each region (A, B, C and D) are recovered using the sampling point determined from the adjacent codeword. Thus, recovery of the symbols in the data packet 101 may use multiple sampling points rather than only a conventional single sampling point.

Symbol recovery using multiple sampling points is advantageous for receiving long data packets transmitted in a time-varying channel to minimize the received bit error rate. Some types of channel distortion, for example, time dispersion distortion, may cause the timing of the transmitted symbols relative to the timing of the receiver to vary after an initial correlation. Correlating the receiver to codewords associated with corresponding regions in the data packet determines the timing, i.e., the sampling point, of the receiver for recovering the symbols in those regions.

Other types of channel distortion, for example, multipath distortion, may cause poor correlation to one or more sampling points. However, it is unlikely that poor correlation would result for all the codewords given the duration of the data packet 101. Correlation to multiple codewords to determine multiple sampling points enables the receiver to recover the symbols with one or more sampling points. A receiver 202 employing the present invention may result in improved audio quality, receiver control operation or data reception for the received data packet transmitted in a time-varying channel.

The data packet 101 includes in sequential order: the DSSW having fourteen symbols, a slow associated control channel (SACCH) having six symbols, sixty-five symbols of data, the CDVCC having six symbols, another sixty-five symbols of data, and six symbols reserved (RSV) for future use. Sequentially following the RSV symbols is the ASSW having fourteen symbols residing in the adjacent data packet 102. The DSSW and the ASSW are typically used for synchronization, equalizer retraining and time slot verification of the data packet 101 and the adjacent data packet 102, respectively, as described in the standard per .sctn.1.2.4. The DSSW and the ASSW have good autocorrelation properties to facilitate synchronization and training. The CDVCC described in the standard .sctn.1.2.5 provides the receiver 202 with channel control information.

Region A includes the six SACCH symbols and twenty-nine data symbols and is adjacent to the DSSW. Region B includes thirty-six data symbols adjacent to the left side of the CDVCC. Region C includes the thirty-six data symbols adjacent to the right side of the CDVCC. Region D includes the six RSV symbols and the twenty-nine data symbols and is adjacent to the ASSW.

The symbols in region A are recovered in a forward direction in time using a first sampling point determined from correlating the receiver 202 to the DSSW. The symbols in region B are recovered in a reverse direction in time using a second sampling point determined from correlating the receiver 202 to the CDVCC. The symbols in region C are recovered in a forward direction in time using the second sampling point determined from correlating the receiver 202 to the CDVCC. The symbols in region D are recovered in a reverse direction in time using a third sampling point determined from correlating the receiver to the ASSW.

Figure 3:
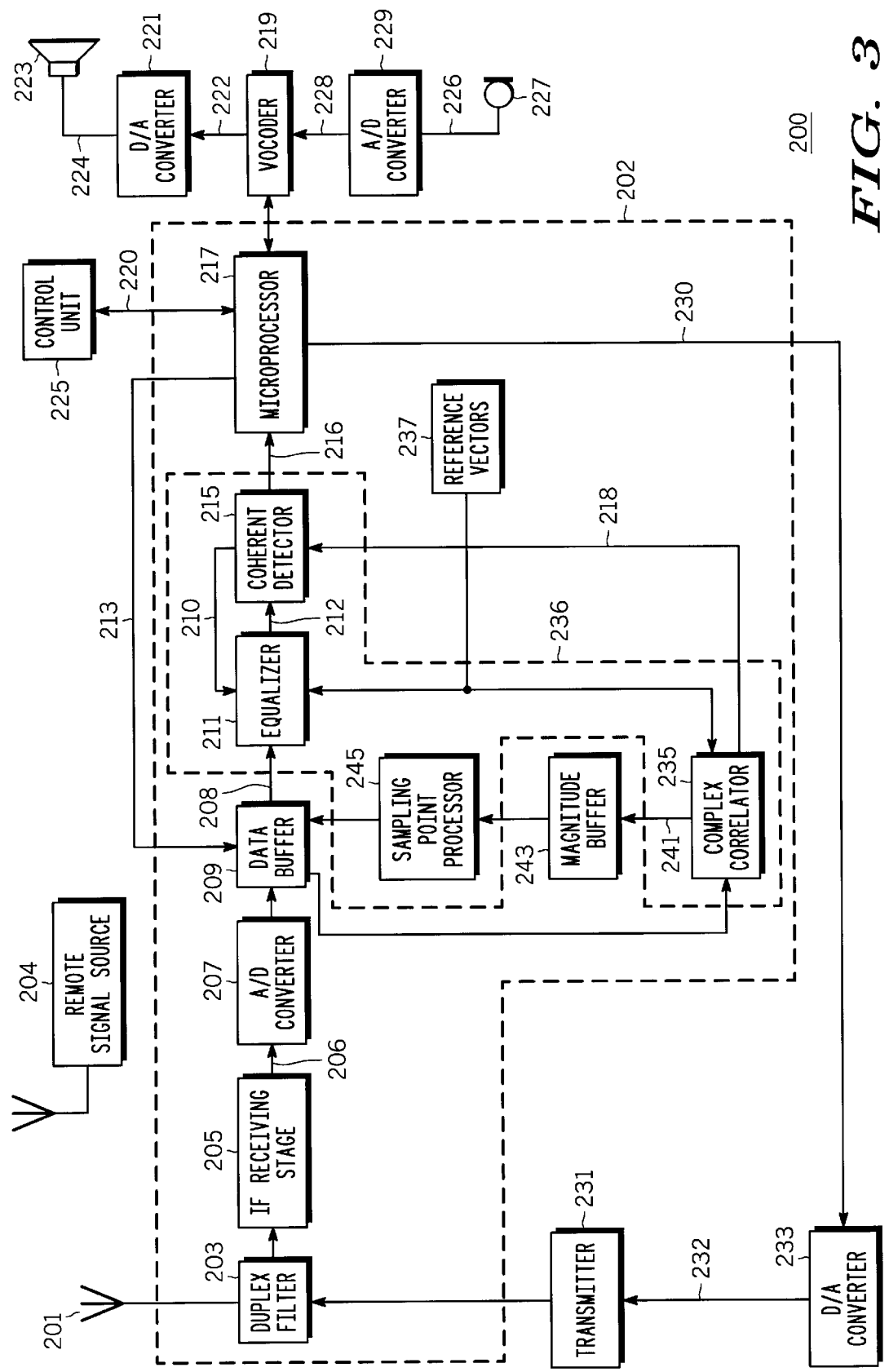
FIG. 3 is a block diagram of a radio telephone transceiver incorporating a receiver for receiving the data packet of FIG. 2.

A block diagram of a cellular radiotelephone 200 employing the present invention is shown in FIG. 3. Radio frequency signals within a radio frequency band are coupled to a duplex filter 203 via an antenna 201. The duplex filter 203 separates the receiver and transmit band of frequencies such that a signal may be received at the same time another signal is transmitted.

An IF receiving stage 205 comprises a filter that is more selective to generate an IF signal at line 206 having a particular frequency within the received band of radio frequency signals. The IF signal at line 206 is converted from an analog signal to a digital signal in the A/D Converter 207 to generate the data packet 101. The data packet 101 is stored in a data buffer memory location at block 209.

A frame sync signal 213 from a microprocessor 217 synchronizes the receiver 202 to the symbols to approximately locate the synchronous codewords in time.

A sampling point processor 245 determines the sampling point for recovery of symbols in the data packet 101. The sampled data packet 101 appearing at line 208 is processed by an equalizer 211 along with a recovered coherent carrier signal at line 210 and a reference vector signal from block 237 to remove time dispersion distortion in the data packet 101. An equalized signal is generated by the equalizer 211 at line 212. A typical channel equalizer structure 211 is a decision feedback equalizer (DFE). The DFE tracks the phase of the data packet and cancels the distortion caused by a delayed version of the data packet. DFE's are described in John Proakis, Digital Communications, Chapter 6 (1989).

The data packet 101 in the data buffer 209 is also coupled to a complex correlator 235. The complex correlator 235 detects the synchronous codeword using a complex correlation of the CDVCC, for example, and a corresponding reference vector stored at block 237. The reference vector has the same value as the predetermined value of the CDVCC. The complex correlator generates a plurality of magnitude output signals at line 241 which are stored in a memory location in a magnitude buffer 243. The sampling point processor 245 compares the plurality of magnitude output signals against each other and selects the peak magnitude output signal. The peak magnitude output signal corresponds to the sampling point at the time of the correlation to the CDVCC in the data packet 101. The sampling point is coupled to the data packet 101 in the data buffer 209 for symbol recovery. Another sampling point is also determined for the DSSW and the ASSW for symbol recovery in the regions A, B, C and D of the data packet 101. Thus, multiple sampling points may be used for symbol recovery of the data packet in a time-varying channel.

Once the distortion is cancelled, a point on the eight point constellation representing a recovered symbol at line 216 is generated by a coherent detector 215 by combing the equalized signal at line 212 and a phase reference signal at line 218 from the complex correlator 235. Coherent detectors are typically used in digital communications for symbol recovery. Coherent detection is described in Bernard Sklar, Digital Communications, Fundamentals and Applications, Chapter 3 (1988).

A microcomputer 217 separates the recovered voice and control symbols. Voice symbols are coupled to a vocoder 219 which decode the voice symbols to produce a digital representation of the voice signal at line 222. The digital voice signal at line 222 is converted to an analog voice signal at line 224 in a D/A Converter 221. The analog voice signal at line 224 is coupled to a speaker 223 providing audible voice.

Voice and control information may be transmitted by the digital cellular radiotelephone 200. The IS-54 standard calls out the content of a transmitted plurality of sequential symbols to be different than the content of the received plurality of sequential symbols. An audible voice message coupled to a microphone 227 produces an analog voice signal at line 226 and is converted to a digital voice signal at line 228 in an analog to digital converter 229. The digital voice signal at line 228 is encoded into symbol information by the vocoder 219. The encoded symbol information is formatted into the data packet 101 with any control information from a control unit 225. The control unit 225 may have a keypad and a display (not shown). The control unit information is coupled between the microcomputer 217 and a control unit 225.

The formatted data packet 101 at line 230 is converted to an analog signal at line 232 by a digital to analog converter 233. The analog signal 232 is transmitted by the transmitter 231 via the duplex filter 203 for subsequent radiation by the antenna 201. The equalizer 211, the coherent detector 215, the complex correlator 235 and the sampling point processor 245 are employed in a digital signal processor, such as DSP56000/56001, produced by Motorola Inc. The use of the DSP56000/56001 is described in DSP56000/56001 Digital Signal Processor User Manual, Revision 1, available from Motorola Inc. The data buffer and the magnitude buffer are memory portions of conventional read access memory (RAM). The reference vectors at block 237 are stored in conventional read only memory (ROM).

The principles governing the complex correlator are well known in the art. The complex correlator 235 may be in the form of a complex finite impulse response filter (FIR), i.e., it contains four real FIR filters. Correlation is done by treating the in-phase and quadrature-phase components of the symbol as a complex number with the magnitude of the I-channel representing the real component and the magnitude of the Q channel representing as the imaginary component.

The portion of the data packet 101 having the synchronous codeword, such as the DSSW, CDVCC or the ASSW, is represented by the following equation:

$$m(kT)=I(kT)+jQ(kT)=a+jb$$

wherein "T" is the symbol time and "k" is a time index as well as a variable of summation. The complex correlation, C, of the input waveform, m(kT), with a reference waveform from block 237, n(kT)=c+jd, is represented by the following equation:

$$C=\Sigma[m(kT)n^*(kT)]$$

wherein n* denotes the complex conjugate of n(kT), c−jd.

The complex correlation, C, having the input synchronous codeword represented by a+jb and a complex conjugate represented by c−jd results in a real output of ac+bd and an imaginary output of j(bc−ad). The magnitude output signal, M, generated at line 241 of the complex correlation 235 is calculated by summing the square of the real output and the square of the imaginary output as follows:

$$M=\sqrt{(ac+bd)^2+(bc-ad)^2}$$

Figure 4:
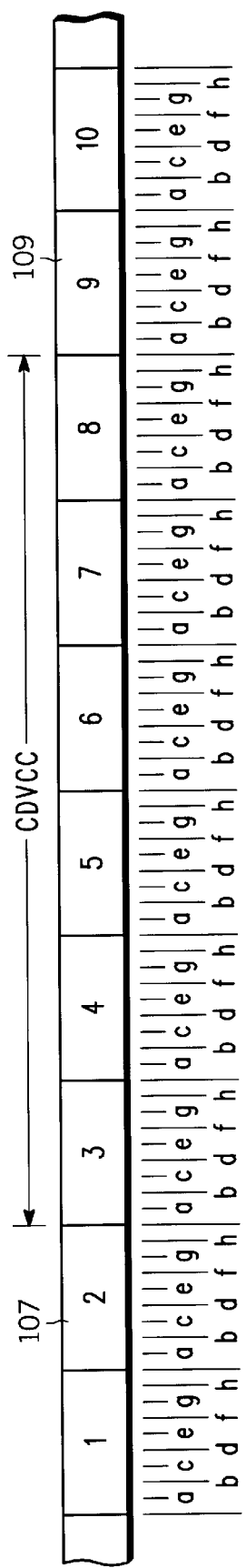
FIG. 4 shows a portion of the data packet of FIG. 2.
Figure 5:
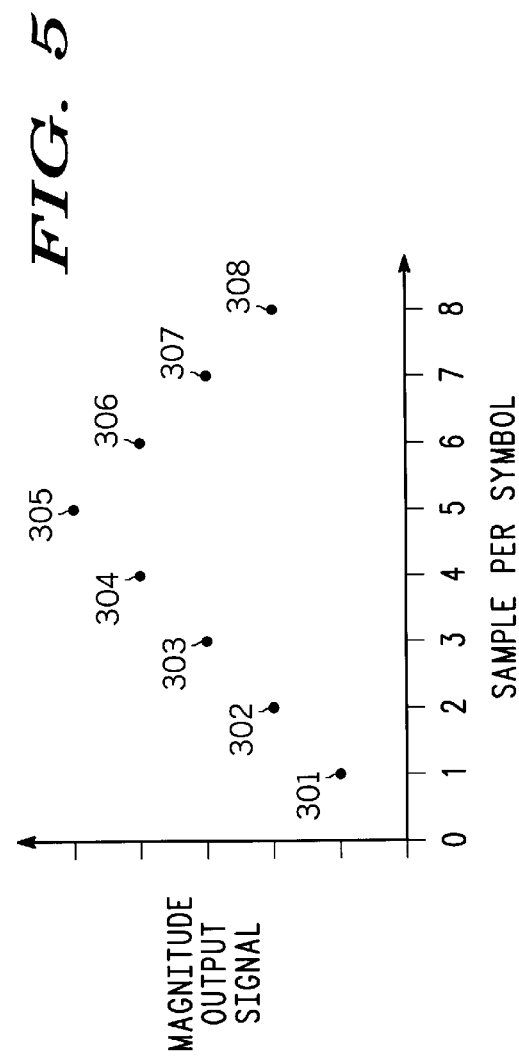
FIG. 5 is a plot of eight magnitude output signals for the complex correlator of FIG. 3.

An example of the complex correlation process is described with FIGS. 4 and 5. FIG. 4 shows a portion of the data packet of FIG. 2 having the CDVCC wherein each symbol is sampled eight times (a–h). Using a frame synchronization procedure, the receiver 202 can determine the approximate location of the synchronous codeword, CDVCC for example. The approximate location of the codeword in the data packet is known in the art as a window. The complex correlation is performed over the smallest window possible to minimize correlation processing time. In accordance with the present invention, a four symbol window is used, i.e., four symbols in addition to the number of symbols in the CDVCC. Under other system circumstances, the number of symbols in the window may vary. The four symbol window in FIG. 4 comprises the CDVCC having six symbols 3–8, the data symbols 1 and 2 to the left of symbol 3 and the data symbol 9 and 10 to the right of symbol 8. The CDVCC may appear anywhere within the window. For example, only one symbol may appear at the left of the CDVCC and resulting in three symbols appearing at the right of the CDVCC.

FIG. 5 is a plot of eight magnitude output signals 301–308 at line 241 generated by the complex correlator 235 of FIG. 3. The complex correlation is performed on each sample of the four symbol window shown in FIG. 4 with the corresponding reference vector from block 237. Each complex correlation produces a magnitude output signal from the complex correlator 235. Correlating the reference vector to the CDVCC over a four symbol window produces thirty two magnitude output signals (eight samples/symbol times a four symbol window). Of the thirty two correlations, one magnitude calculation provides the best information for determining the sampling point for the CDVCC.

For the sake of brevity, only eight magnitude output signals are plotted in FIG. 5. The magnitude output signals 301–308 correspond to the complex correlation of each symbol of the reference vector with the same sample of each symbol 3–8, respectively, of the CDVCC. For instance, the magnitude output signal 301 is produced by correlating the six symbols of the reference vector to sample "a" of the six symbols 3–8 of the CDVCC, respectively. Similarly, magnitude output signal 305 is produced by correlating the six symbols of the reference vector to sample "e" of the six symbols 3–8 of the CDVCC, respectively.

The magnitude output signals vary in intensity depending on how close the reference vector is correlated to the CDVCC. The best correlation is indicated by a peak magnitude output signal denoted point 305 in FIG. 5. The peak magnitude output signal corresponds to the optimum sampling point for the CDVCC in the data packet at that particular instant in time. Although the complex correlation described with FIGS. 4 and 5 involve a particular matching process, other algorithms may be utilized to determine the optimum sampling point.

A peak magnitude output signal corresponding to an optimum sampling point is determined for the DSSW, the CDVCC and the ASSW. Thus, multiple sampling points are available for recovering all the symbols within corresponding discrete regions at different points in time over the duration of the data packet 101. Depending on the type of distortion in the channel and the signal intensity over the duration of the data packet 101, decisions may be made on which region of the data packet 101 to recover using one of the selected sampling points. Although effective for providing color code protection for practical communication systems, the arrangement of FIGS. 2–5 requires a certain amount of overhead, consuming the symbols in the time slot format. As will be seen below, systems employing so-called "dual purpose" symbols alleviate the overhead for color code capability.

As mentioned above, the present invention has found immediate application with a particular Time Division Multiple Access (TDMA) communication system commercially available from Motorola, Inc. The system is referred to as Integrated Dispatch Enhanced Network ("iDEN"). This particular TDMA system is a high-capacity digital trunked radio system providing integrated voice and data service. The system uses 16-QAM digital modulation and Vector Sum Excited Linear Predictor (VSELP) speech coding techniques along with Time Division Multiple Access (TDMA) channel access methodology to provide enhanced system services and channel capacity. As will be seen herein, the present invention provides further enhancement to the systems services, as well as increasing the channel capacity.

In the iDEN system, a single inbound/outbound frequency pair is shared among three or six users via six 15 millisecond time slots, with each user transmitting and receiving during an assigned time slot interval. As a result, inbound transmission is a pulsed RF signal with a 1/6 or 1/3 duty cycle. Each user is assigned a unique channel designation which is a function of a time slot definition and carrier number specifying the inbound/outbound frequency pair. As mentioned above, in dense usage areas, frequency pairs assigned to one user are re-used in other geographical areas. However, due to atmospheric and other effects, the re-used inbound/outbound frequency pairs may interfere with one another.

Figure 6:
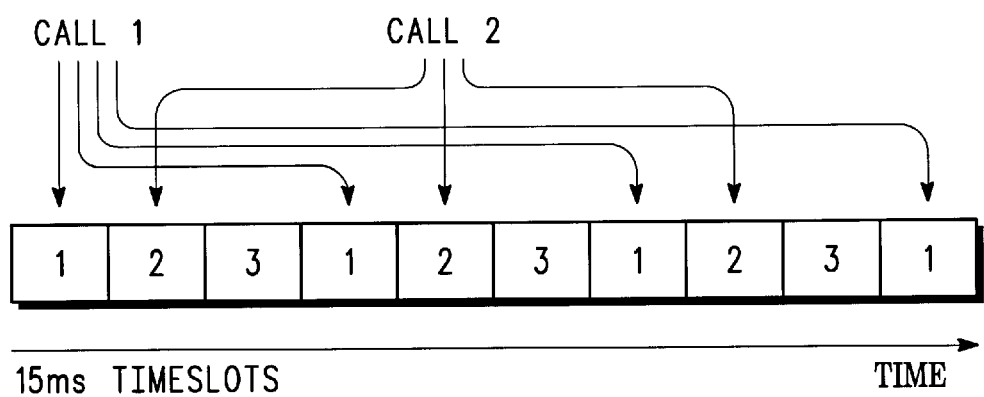
FIG. 6 is a schematic diagram of call assignments.

Referring to FIG. 6, an example of a 3:1 service is given, in which a user is allocated every third 15 millisecond time slot on a single frequency. As indicated, call 1 is assigned interleave 1 and call 2 is assigned interleave 2. Time slots are also available for a third user, call 3. Together, the interleaved time slots comprise a serial succession of time slots for a given channel that is for a given frequency.

Each time slot in the system is comprised of four sub-carriers or sub-channels which carry digital modulation. In this digital format both amplitude and phase modulation is carried out according to well known 16-QAM modulation on four sub-carriers. The frequency plan for iDEN systems employs carrier numbers to designate channel frequencies. The relationships of carrier numbers to inbound and outbound frequencies are determined according to known relationships. Details concerning the 16 Quadrature Amplitude Modulation (QAM) system are given in U.S. Pat. No. 5,519,730, the disclosure of which is incorporated by reference as if fully set forth herein. In the system, phase and amplitude orthogonal axes Q, I define four quadrants each of which has a constellation of four modulation values or symbols. Included among the symbols, as will be seen herein are sync symbols, pilot symbols, data symbols, color code symbols and ACP symbols.

On each of the four sub-channels, digital symbols, i.e., wave forms that have precisely defined amplitude and phase are transmitted. Each symbol has 16 possible amplitude and phase combinations which convey four bits of information by mapping the 16 possible four-bit quantities to one of the 16 possible symbols. Symbols are transmitted at a rate of 4 kHz, so each symbol has a 250 microsecond duration. Accordingly, the time slot is timewise divided into so-called "symbol positions", preferably of equal duration. In theory, any of the sync symbols, pilot symbols, data symbols, color code symbols and ACP symbols may be located at virtually any symbol position as may be desired. In practice, the time slot is characterized by a per-selected pattern of symbol positions, referred to herein as a time slot "format". The actual transmission of symbol wave forms over-the-air is termed "physical layer" which makes up the raw transmission path that all other communication links ride upon. The outbound path generally refers to communication from the infrastructure or base station to the mobile or subscriber unit. Conversely, the inbound communication path refers to communications from the subscriber unit to the infrastructure. The data communicated is frequently referred to as payload, and the remaining necessary systems communications are referred to as overhead.

Further information concerning the iDEN communication system available from Motorola, Inc. may be found in U.S. Pat. Nos. 5,519,730 and 5,548,631, the disclosure of which is incorporated by reference as if fully set forth herein.

Figure 7:
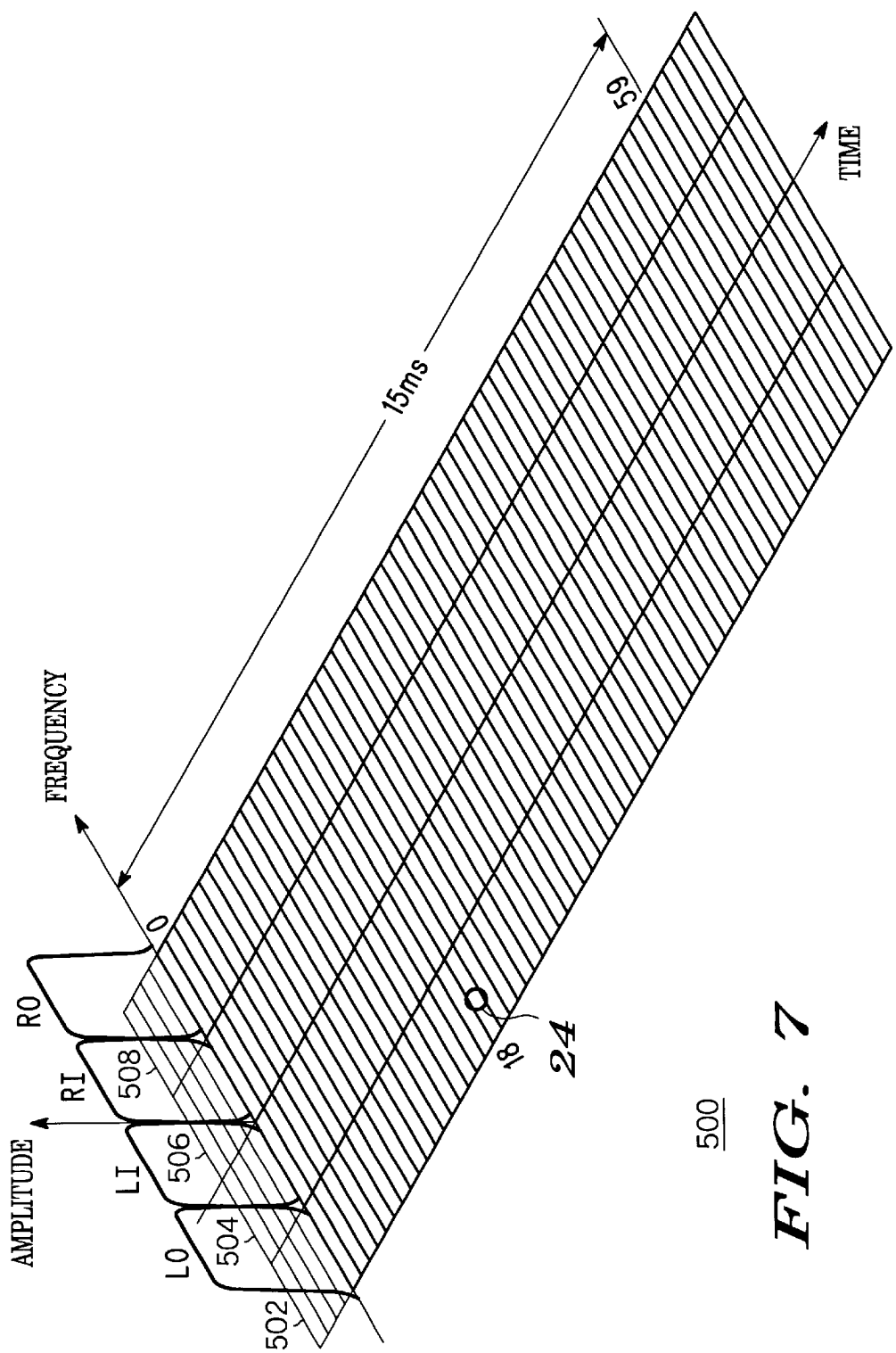
FIG. 7 is a three-dimensional schematic diagram of a full outbound time slot format.

Referring now to FIG. 7, a Full Outbound Time slot is shown in a three-dimensional schematic diagram. In FIG. 7, a single, representative time slot 500 is shown comprised of four sub-channels 502–508. In the example shown in FIG. 7, time slot 500 is divided into sixty divisions, or symbol positions. Thus, in time slot 500 there are 240 symbol positions transmitted over the 15 millisecond interval. Conventionally, the four sub-channels or sub-carriers 502–508 are designated Left Outer (LO), Left Inner (LI), Right Inner (RI) and Right Outer (RO). In FIG. 7, the sixty symbol positions are numbered 0 through 59. The X and Y axes are laid out for time and frequency, while the Z axis denotes amplitude. At symbol position 18 on the Left Outer sub-channel 502 a phase-amplitude (Q-I) diagram indicates a modulation value 512 in the upper right quadrant each of the symbol positions in the four sub-channels can assume any of the values of the phase-amplitude diagram 514 illustrated in FIG. 7.

Figure 8:
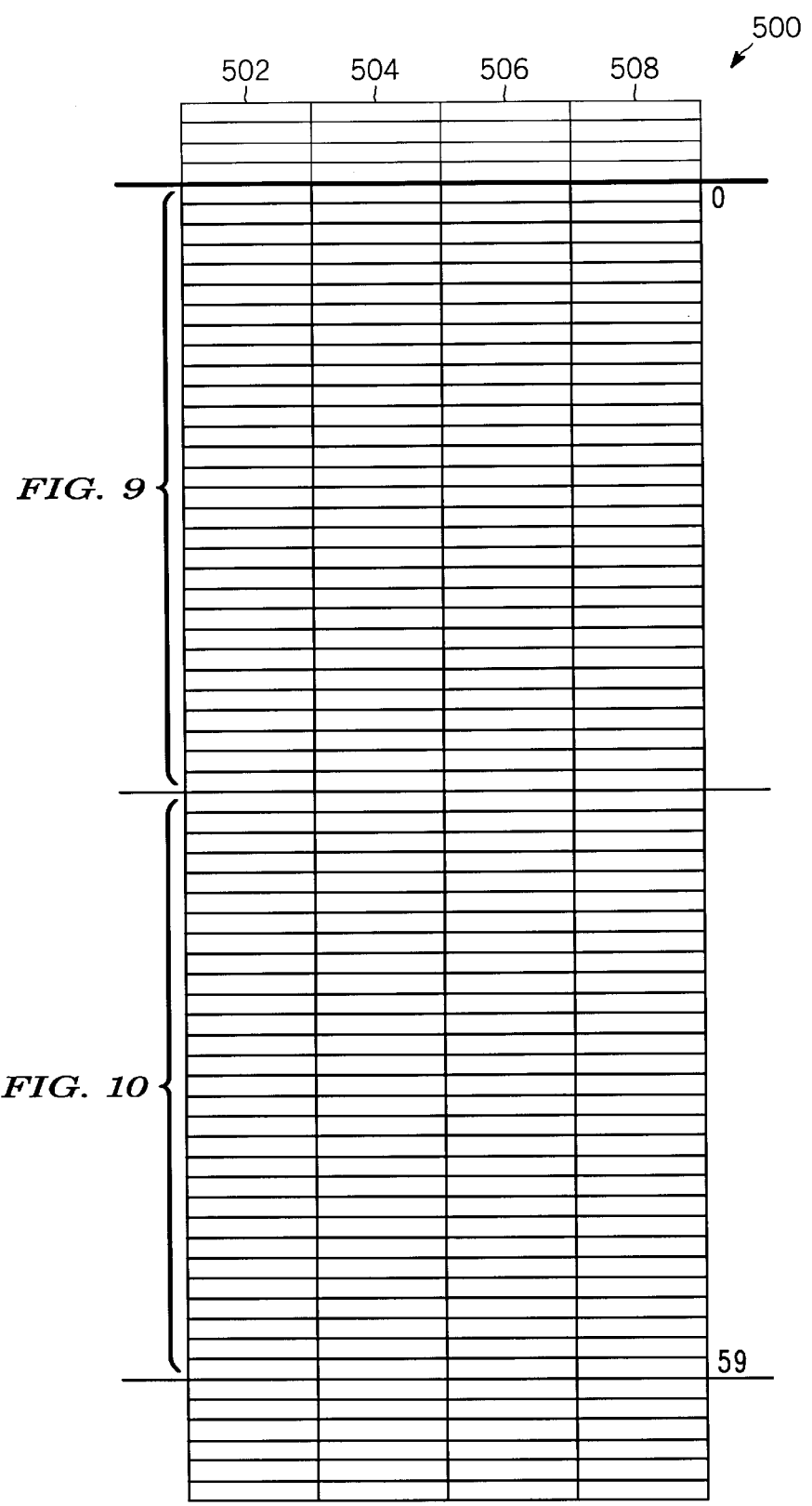
FIG. 8 is a top plan view thereof.

Referring to FIGS. 8–10, system assignment or slot format for the symbol positions is shown. FIG. 8 comprises a top plan view of the three-dimensional diagram of FIG. 7. FIGS. 9 and 10 together comprise the diagram of FIG. 8, taken on an enlarged scale. In the arrangement of FIG. 7, the first three symbol positions of the four sub-channels 502–508 carry sync symbols 520, ACP symbols 522 are located adjacent the beginning and ending of time slot 500 in sub-channels 506 and 504, respectively. Color code symbols 524 are located immediately following the block of sync symbols at the beginning of sub-channels 502, 504.

Color code symbols 524 are also located at the end of time slot 500, on sub-channels 506, 508. A plurality of pilot symbols 526 are spaced periodically along the sub-channels 502–508. Each sub-channel has seven pilot symbols 526. The remaining symbol positions carry the payload of data symbols 530.

At the beginning of time slot 500, the first three symbols of each sub-channel makeup the sync wave form. Each symbol position in this block carries a sync symbol 520. The sync symbol block in symbol positions 0–2 of the four sub-channels is provided to allow the receiver to lock onto the time slot and to provide timing information to decode the remaining time slot symbols. The pilot symbols 526 spaced throughout the time slot are used to combat the effects of fading. The color code symbols 524 have 16 possible combinations and are assigned so that the closest cellular areas which were used frequencies are assigned different color codes, a measure to prevent cross talk arising from co-channel interference. The color code symbols 524 are inserted in the time slot so that, with a high probability, another interfering signal will have a different color code value and thus can be differentiated. The receiver discards or rejects the time slot having a different color code value so that the interfering payload (e.g., data symbols carrying audio) will not be inserted into the call. The ACP symbols are Associated Control Procedure symbols dedicated to secondary types of control communications.

As indicated in diagram 514 in FIG. 7, each symbol resides on a constellation which is a phase/amplitude plot where the real axis represents the in-phase portion of the wave form and the imaginary axis represents the quadrature component. These combinations or constellation values define the 16 possible symbol values at every location.

Figure 11:
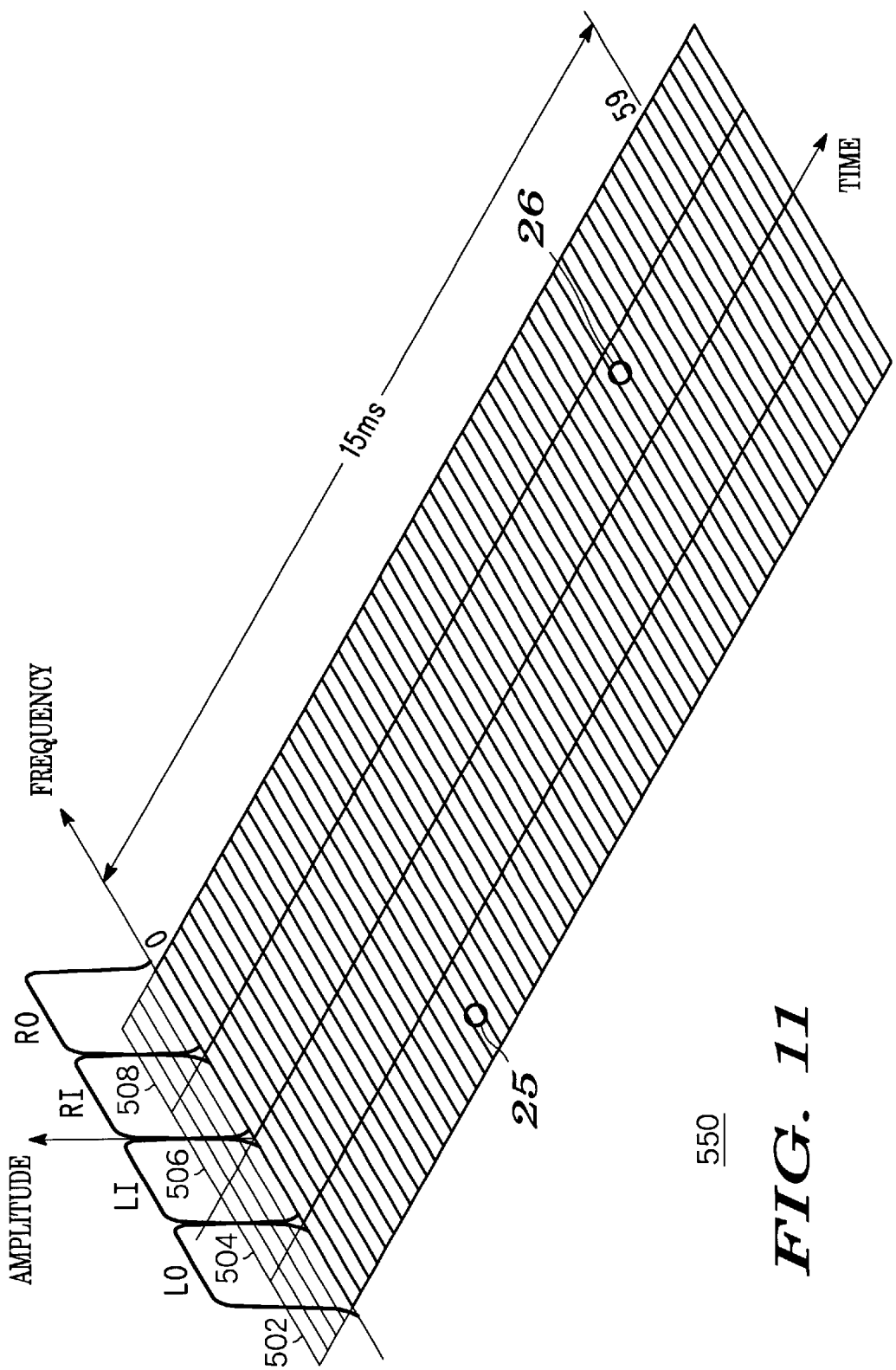
FIG. 11 is a three-dimensional diagram showing a split outbound time slot format.
Figure 12:
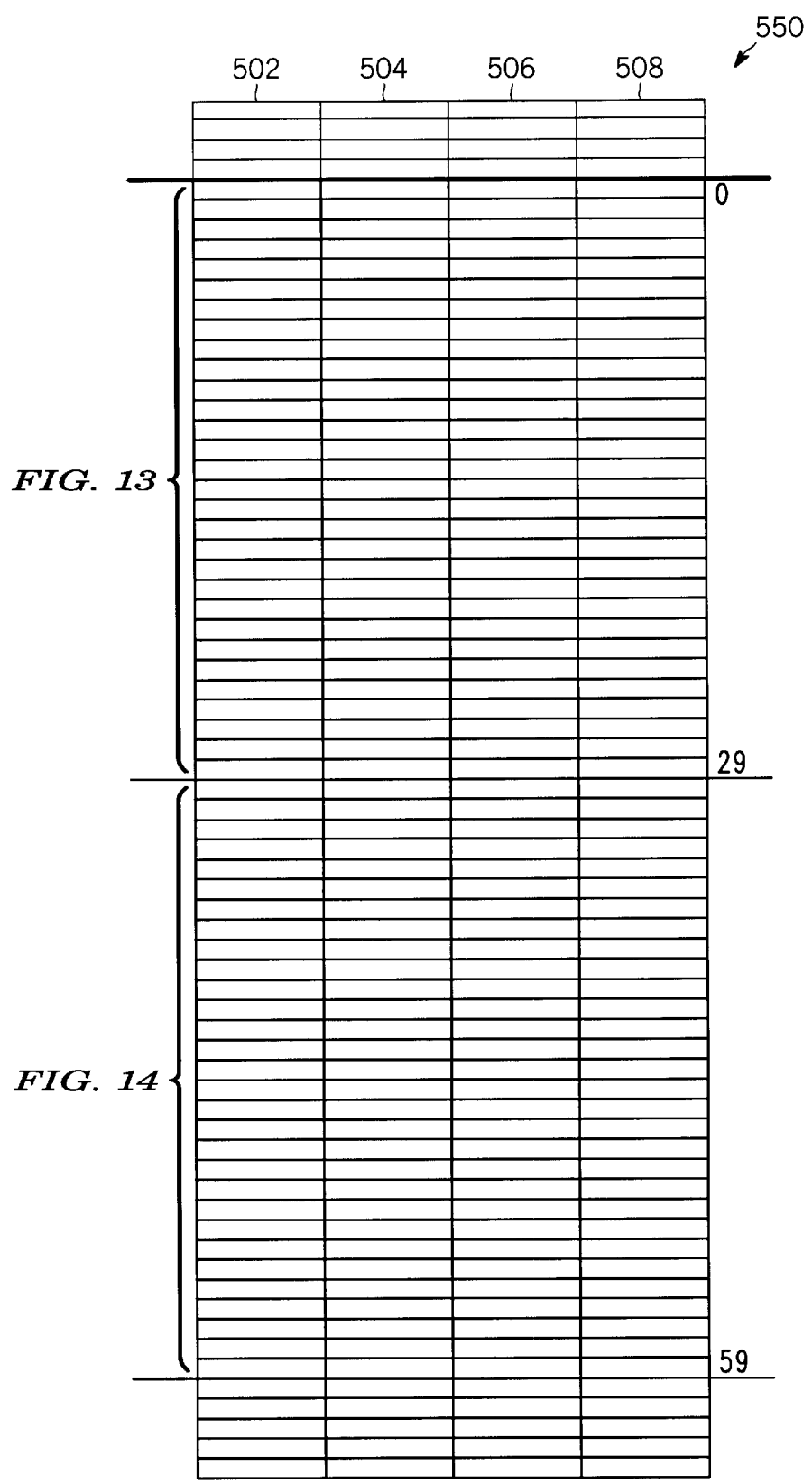
FIG. 12 is a top plan view thereof.

Referring now to FIG. 11, a split outbound time slot 550 is shown. As in the preceding format, time slot 550 is divided into four sub-channels 502–508 and sixty time divisions or symbol positions numbered 0–59. FIG. 12 represents a top plan view of the three-dimensional diagram of FIG. 11 and FIGS. 13 and 14 together comprise diagram of FIG. 12, taken on an enlarged scale. As in the preceding time slot format, time slot 550 begins with three symbol positions 0–2 in each of the four sub-channels 502–508. ACP symbols 522 are located in symbol position 4 of Left Inner sub-channel 506 and Right Inner sub-channel 508 and in symbol position 49 in the same sub-channels 506, 508. Color code symbols are located in the Left Outer and Left Inner sub-channels 502, 504 immediately following the sync block 554 and are located adjacent the end of time slot 550 in symbol position 57 of sub-channels 504, 506. Pilot symbols 526 are spaced throughout each sub-channel with seven pilot symbols being provided in the Outer sub-channels 502, 508 and five pilot symbols in the Inner sub-channels 504, 506. Referring to FIG. 11, diagram 560 indicates a data value in one symbol position of sub-channel 502, while diagram 564 indicates a value 566 of an ACP symbol in sub-channel 506. The remaining symbol positions contain payload of data symbols 530 which are sent to two different users.

Figure 15:
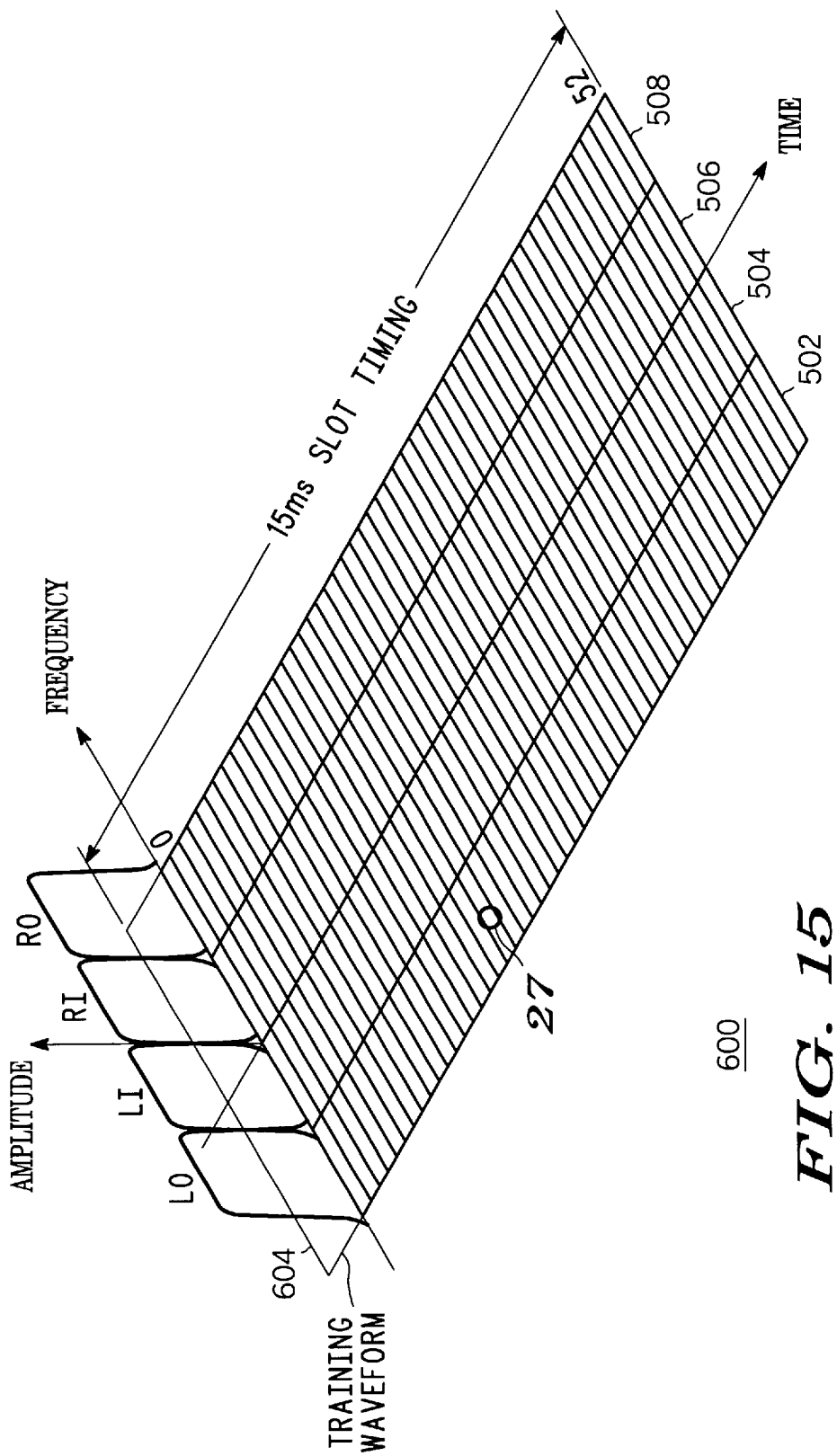
FIG. 15 is a three-dimensional schematic diagram of an inbound reserve access time slot format.
Figure 16:
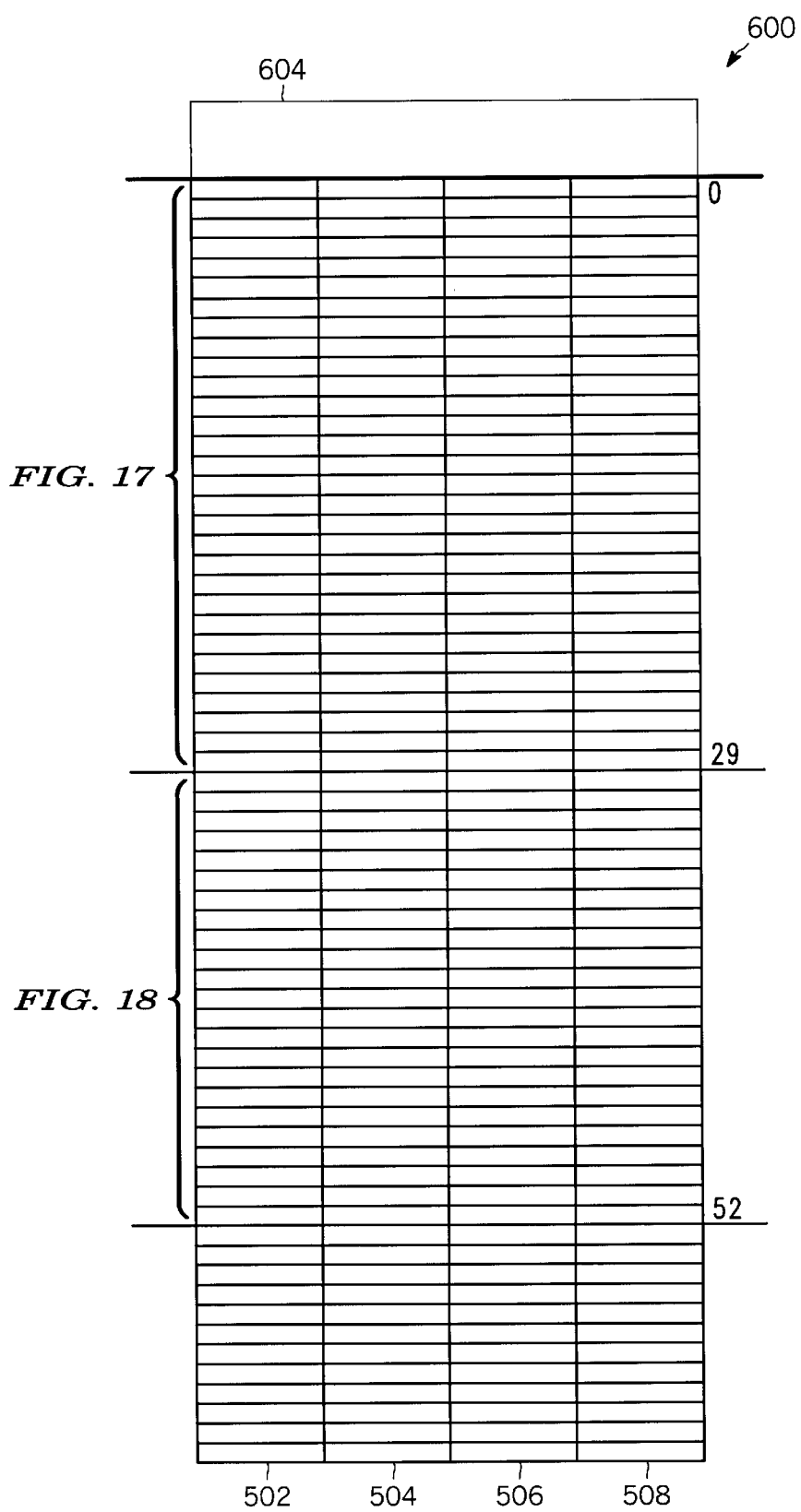
FIG. 16 is a top plan view thereof.
Figure 17:
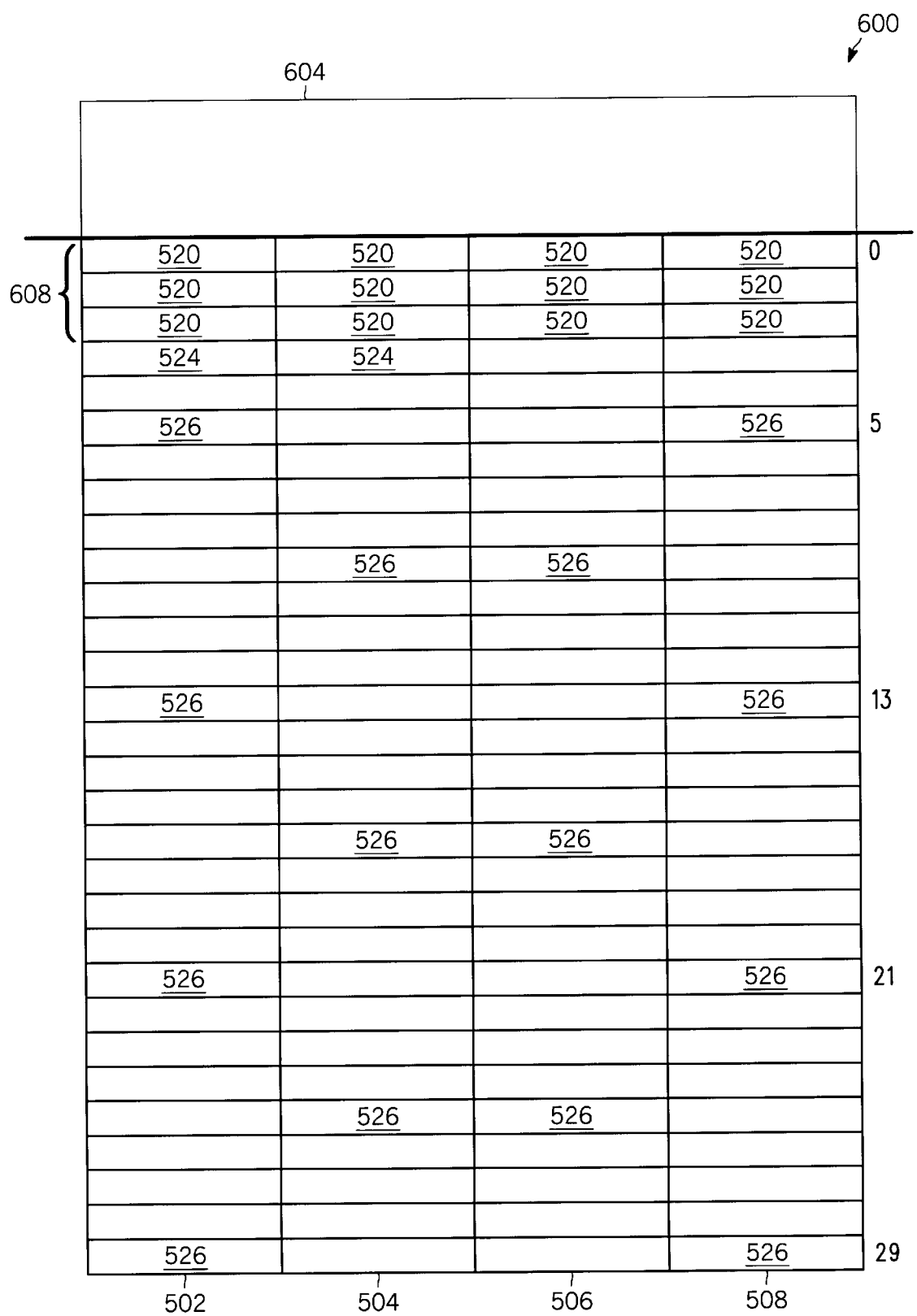

Referring now to FIG. 15, a full reserved inbound time slot is indicated at 600. Time slot 600 is comprises of four sub-channels 502–508 and has a 15 millisecond duration with a training wave form 604 and fifty-three symbol positions 0–52. FIG. 16 comprises a top plan view of the three-dimensional diagram of FIG. 15 and FIGS. 17 and 18 together comprise the diagram of FIG. 16 taken on enlarged scale. Immediately following training wave form 604, symbol positions 0–2 in each sub-channel 502–508 carry a sync symbol 520. Color code symbols 524 immediately follow the sync block 608 in sub-channels 502, 504 and are located in sub-channels 506, 508 immediately adjacent the end of the time slot, in symbol position 51. As in the preceding formats, each sub-channel includes a spaced series of pilot symbols 526 with each sub-channel 502–508 having seven pilot symbols.

Figure 19:
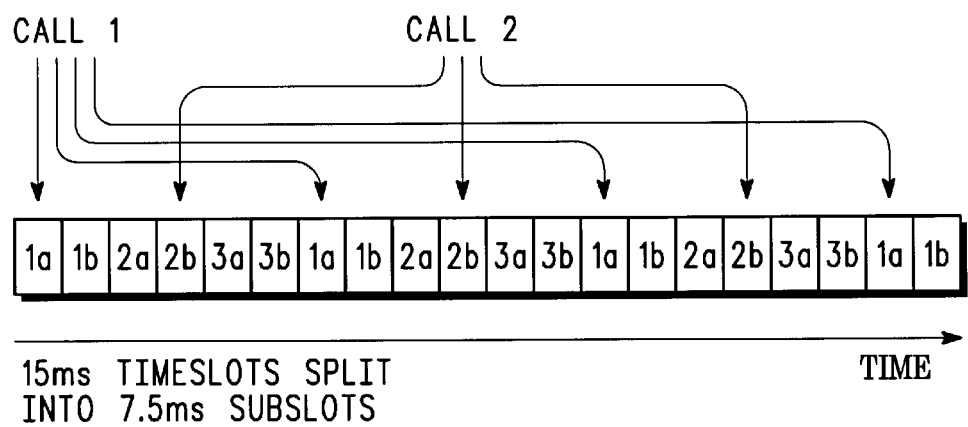
FIG. 19 is a schematic diagram of a call assignment.
Figure 20:
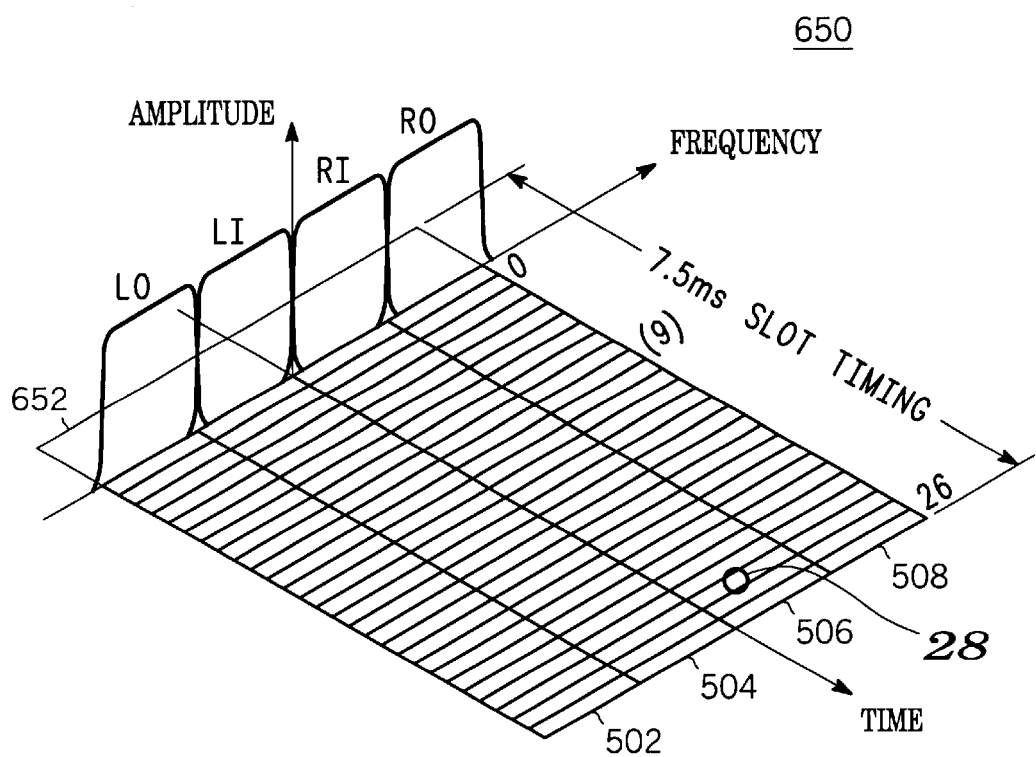
FIG. 20 is a three-dimensional schematic diagram of an inbound split reserved access time slot format.
Figure 21:
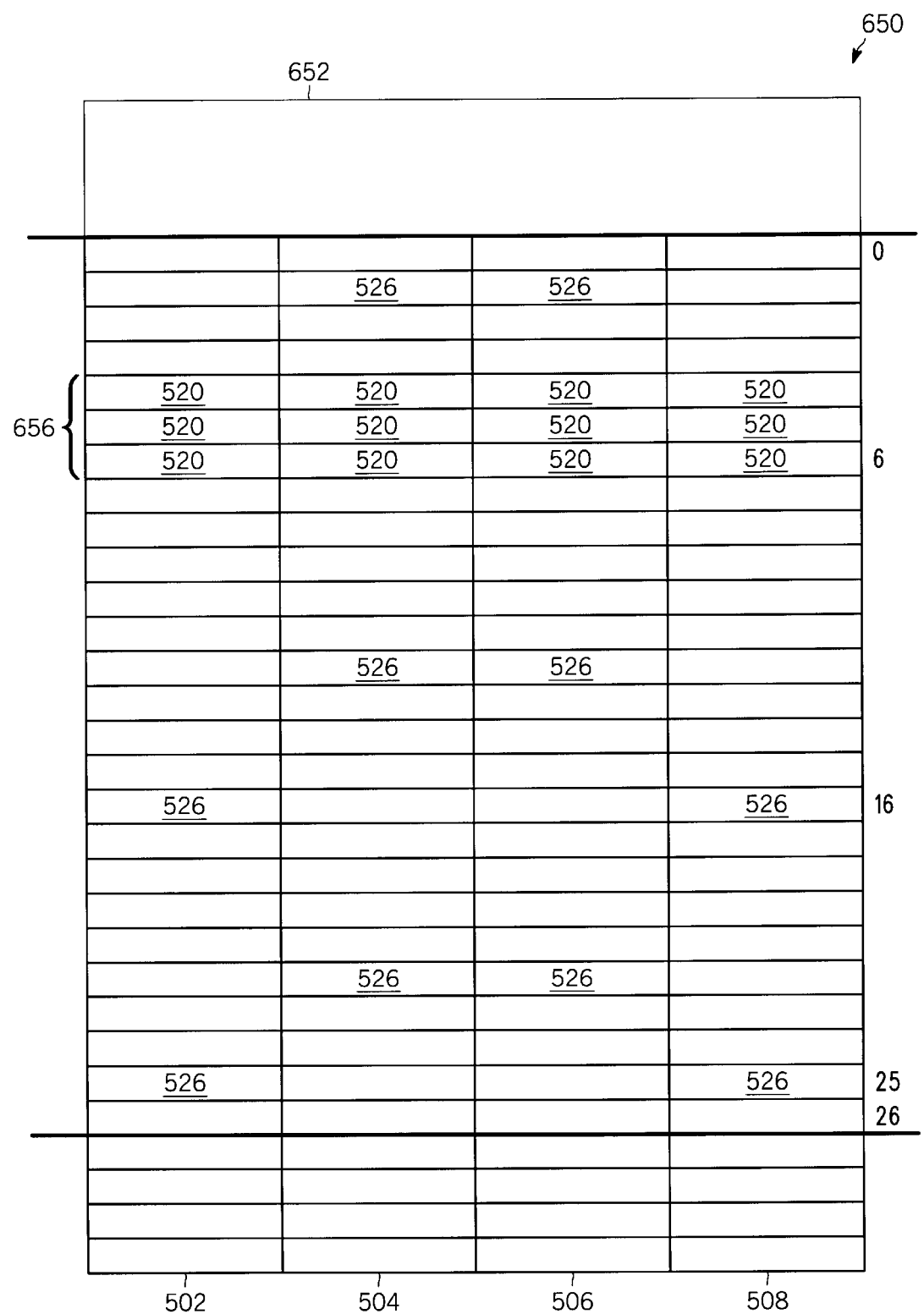
FIG. 21 is a top plan view thereof.

Referring now to FIGS. 19–21, an inbound split, reserved access time slot of a digital time division multiple access communication system is indicated at 650 in FIG. 20. Time slot 650 has a duration of 7.5 ms, one-half of the 15 ms duration of the preceding time slots. Referring to FIG. 19, time slot 650 comprises a split 3:1 reserved access time slot occupying either the first 7.5 ms or the second 7.5 ms of a standard 15 millisecond time slot interval. Time slot 650 comprises a pseudo-training wave form 652 and twenty seven symbol positions numbered 0–26. As with the preceding format, time slot 650 is comprised of four sub-channels 502–508. Pilot symbols 526 are located between the pseudo-training wave form 652 and the sync block 656 comprised of three consecutive symbol positions in each sub-channel 502–504 located at symbol position 4–6 in each sub-channel. A series of pilot symbols 526 are spaced throughout each sub-channel with the inner sub-channels 504, 506 having three pilot symbols each, while the outer sub-channels 502, 508 have two pilot symbols each.

Unlike the preceding formats, time slot format 650 does not include dedicated color code symbols. The time slot format does however contain color code protection, as will be described herein. Referring to FIG. 20, a diagram 660 shows a value 662 of a data symbol in sub-channel 506. Unlike the preceding time slot formats, time slot format 650 sync symbols are not the first symbols are not the first symbols in the time slot, rather data/pilot symbols are located before and after the sync block. The time slot format 650 carries 45 ms of payload (i.e., audio information) but does so in half the time of the preceding time slot formats, effectively doubling the system capacity.

Figure 22:
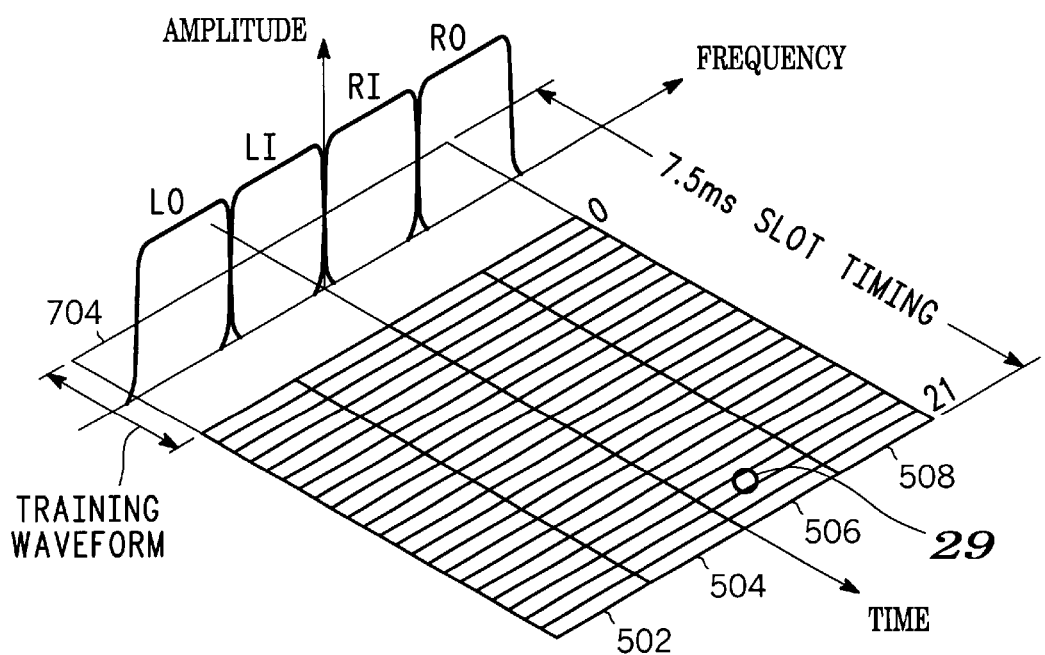
FIG. 22 is a three-dimensional schematic diagram of an inbound split reserved access time slot format with training.
Figure 23:
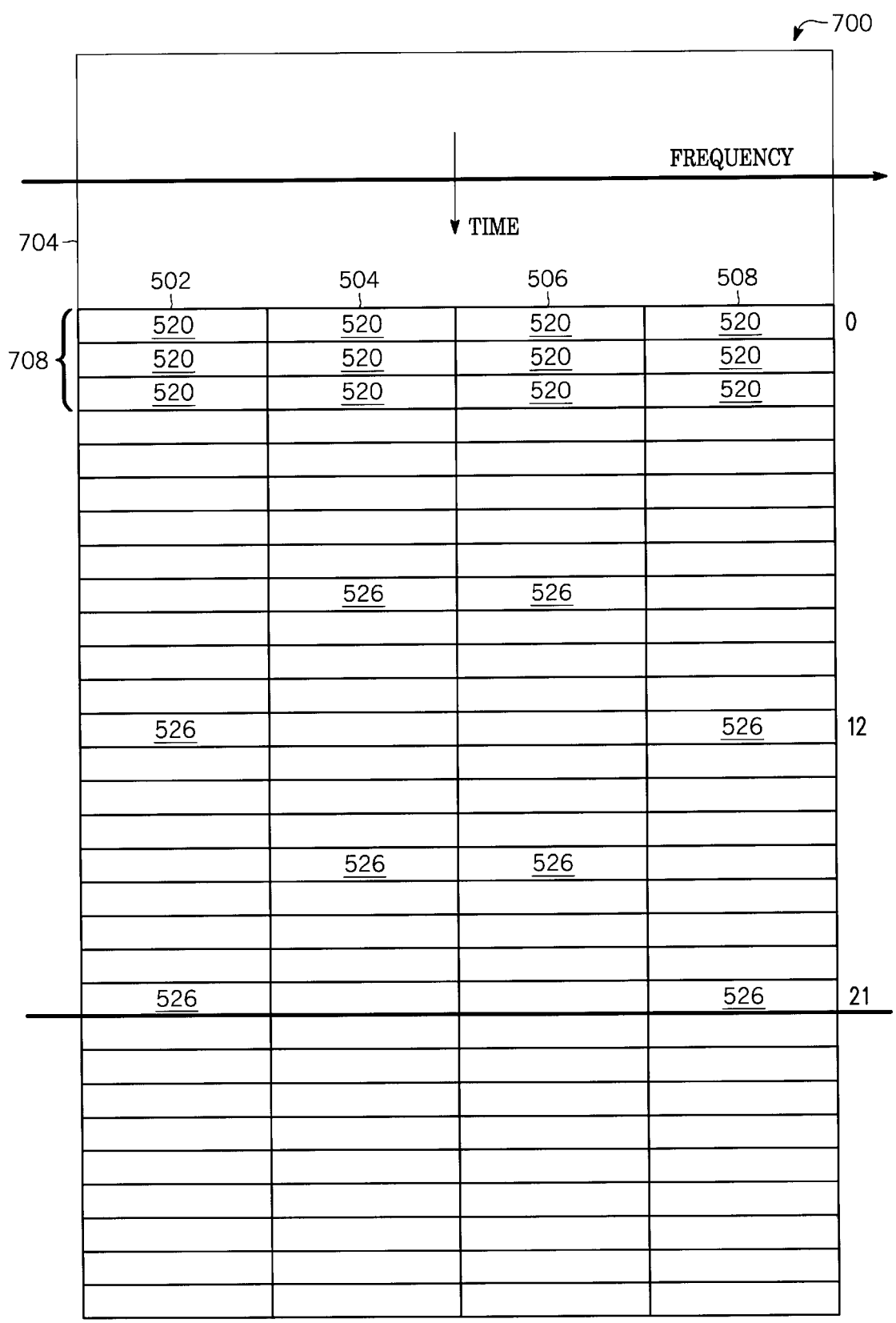
FIG. 23 is a top plan view thereof.
Figure 24:
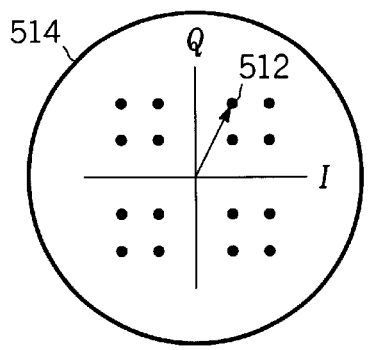
FIG. 24 shows a portion of FIG. 7, taken on an enlarged scale.
Figure 25:
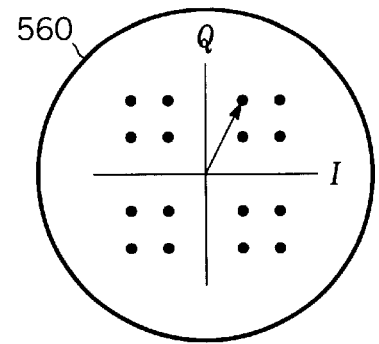
FIGS. 25 and 26 show portions of FIG. 11, taken on an enlarged scale.
Figure 26:
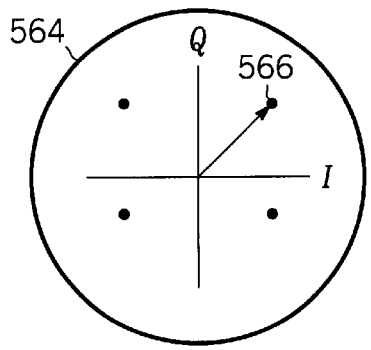
Figure 27:
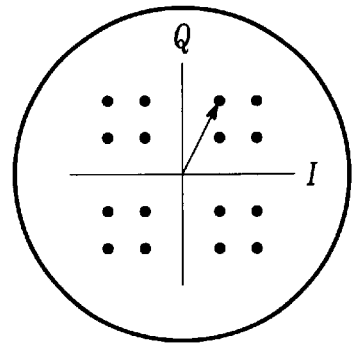
FIG. 27 shows a portion of FIG. 15, taken on an enlarged scale.
Figure 28:
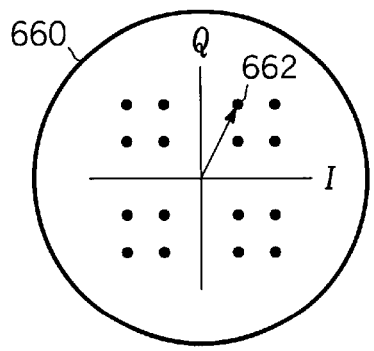
FIG. 28 shows a portion of FIG. 20, taken on an enlarged scale.
Figure 29:
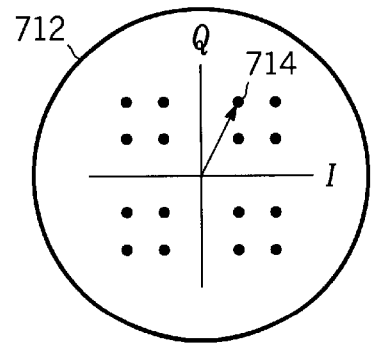
FIG. 29 shows a portion of FIG. 22, taken on an enlarged scale.

Turning now to FIGS. 22 and 23, a format 700 for an inbound, split reserved access time slot with training is shown. As with the preceding formats, time slot format 700 includes four sub-channels 502–508. Included in the format is a training wave form 704 followed by twenty-two symbol positions numbered 0–21. A sync block 708 is located in symbol positions 0–2 of each sub-channel 502–508. Pilot symbols 526 are spaced throughout each sub-channel with each sub-channel having two pilot symbols. Referring to FIG. 22, diagram 712 indicates the value 714 of a data symbol in sub-channel 506. In time slot format 700 a split 3:1 reserved access time slot with training occupies either the first 7.5 ms or second 7.5 ms of a standard 15 millisecond time slot interval. The difference between this time slot and the split reserve access time slot of FIG. 20 is that the training wave form 704 is extended to the first sync symbol, occupying symbol position 0. Again, time slot format 700 is devoid of dedicated color code symbols, with color code protection being provided in a novel manner, to be explained below.

The present invention addresses problems of fading arising as the transmitted signal propagated through the air, bounces off of various objects, taking several paths to reach the receiver. As a result, the transmitted signal experiences changes in amplitude and phase, with the rate of change of fading being determined by vehicle speed, with faster speed producing faster fading. The path dependent change of amplitude and phase of the received signal is termed "channel gain". Conventional pilot interpolation is used to remove the effects of fading.

The expected fading rate determines the designed pilot symbol density, in practical systems. The sub-channel monitored, needs to be sampled at twice the highest frequency at which it is changing (i.e., the nyquist rate). In the time slot formats illustrated in FIGS. 20 and 22, the preferred sampling is accomplished by having every eighth symbol in each sub-channel being assigned a pilot symbol and by staggering the pilot symbol placements in adjacent sub-channels, as can be readily seen in FIGS. 20 and 22.

In each of the time slot formats 20, and 22 as well as the preceding time slot formats utilizing dedicated color code symbols, pilot symbols are distributed throughout each time slot format, in time and frequency. Pilot symbols are selected without regard to, (i.e., are independent of), original information signals. With a minimum of expense and computing burden, receivers efficiently process pilot symbols since they are pre-determined, and comparing the received pilot symbols to the known value of the pilot symbols the receiver can determine channel gain throughout the duration of the time slot format. By interpolating between the pilot symbols in time and frequency, an estimate of the channel gain at various data symbol positions can be made. From these estimates, the effects of fading can be removed and the data symbol can be recovered in a process referred to as "data detection". Pilot interpolation takes an assumed correlation function in time and frequency and an assumed signal to noise ratio and computes the best estimate of the channel gain at the data symbol positions based on surrounding pilot symbol values.

In carrying out the present invention, the receiver uses conventional diversity reception to combat fading. Using this technique, multiple antennas are employed to enhance reception in the presence of fading. In an environment where fading and noise are the only degradations, receivers preferably use max-ratio combining, as is known. The max-ratio combining forms a weighed sum of the signals from each receiver antenna in proportion to the signal-to-noise ratio of each of the antennas signals. This maximizes the signal-to-noise ratio (S/N) of the composite signal made up of signals from all antennas or "branches". In effect, this simulates phasing of each antennas signal so as to steer the main lobe of the antenna pattern formed by all the antennas, toward the mobile unit.

When interference is also present, optimal combining (also called smart antenna) is used. Optimal combining is similar to max-ratio combining but it seeks to maximize signal-to-noise plus interference ration S/(N+I). This can be thought of as phasing each antenna's signal so as to steer the main lobe of the antenna pattern formed by all the antennas generally toward the subscriber unit while slightly detuning it so that an interferer signal now lands in a null of the antenna pattern. The overall effect is to experience slightly worse but tolerable reception of the desired signal than the max-ratio method would provide, while virtually eliminating the interference which the max-ratio method would not do. The net result is that signal-to-noise plus interference ration S/(N+I) is minimized, providing better performance.

Because the optimal combiner is a reference-based system, i.e., it uses knowledge of the desired signal's sync and pilot phases to cancel interference, shortcomings have been experienced in prior art systems. Because all prior art subscribers use the same sync and pilot phases, signal sync and pilots and interferer sync and pilots cannot be differentiated, except for the presumption that the interferer is noticeably delayed in time for the desired signal (because it is generally farther away). Since the interferer is also on the same frequency, this particular type of interference is often called "co-channel" interference. This presumed noticeable time difference is relied upon to effectively decorrelate the interference enough from the desired signal that conventional optimal combining techniques can be used. As the time difference increases, so does the practical effectiveness of optimal combining.

As mentioned, in prior communication systems the same sync and pilot values are employed for all users. In the present invention, the sync and pilot values are functions of defined color code values and, with a high probability that different users will have different sync and pilot values, even though they may share the same frequencies and other characteristics associated with over-the-air transmissions. The invention's use of sync and pilot sets which contain expanded space color code extensions virtually assure that the interferer signal's sync and pilot phases are different from the desired signal's pilot and sync phases. As mentioned, the present invention has found immediate commercial application in the Motorola "iDEN" system. In present commercial applications of the Motorola "iDEN" system, optical combining is associated only with inbound transmissions. However, the present invention is not so limited and can be applied to outbound transmissions as well.

The technique of error correction introduces redundant bits of information in a controlled way so that on the receiving end the original information can be correctly received, even in the presence of bit errors. The amount of redundancy added (or rate of the code) controls the amount of correction the code is capable of. The rate is the total number of coded bits divided by the number of information bits. For example, a rate 1/2 code will take 1 information bit and output 2 coded bits. Since twice the original number of bits is sent, it is a half rate code. A lower rate code has more protection than a higher rate code because it has increased redundancy.

All audio information in the payload is not all equally important. The most important bits are encoded with the lowest rate code (class 1 bits), as distinguished from the next most important (class 2 bits). Some bits are not very important and they are not error coded at all (class 3 or uncoded bits). The most important bits are also encoded with a cyclical redundancy code (CRC). This code is run on the class 1 bits prior to being error coded to obtain a value. Then both the original class 1 bits as well as the CRC value are error coded. The receiver, upon decoding both the class 1 bits and the CRC bits, computes a new CRC on the decoded class 1 bits and compares it to the received CRC. If they match, the most important bits are correct and the audio information in the whole received time slot is sent to the infrastructure. If the CRC fails, the time slot data (audio) for the time slot is discarded.

In certain aspects the present invention makes several improvements: it removes the dedicated color code symbol, thus increasing data throughput; it expands the color code "space" which is the number of different color codes that are possible; and it allows the optimal combiner to perform in conditions where the desired signal and interfering signal do not have a sufficient delay between them.

As mentioned above, the present invention avoids the use of dedicated color code symbols. The symbols that would have been used for color code are now available for increased data payload. For current embodiments of the iDEN system, this saves 4 symbols per 7.5 ms inbound Split 3:1 time slot, better balancing the inbound and outbound payloads. Because a dedicated portion of the inbound time slot is overhead, in splitting the time slot, the percentage overhead grows. Recovering the dedicated color code symbols for payload helps mitigate imbalances between outbound and inbound transmission. The invention maps color code extensions to sync sets, by assigning one of 16 syncs to each of the 16 color codes, i.e., color code extensions to the sync sets, for the preferred 16-QAM transmission format. The present invention may, however, be employed with systems of different configurations and different orders of modulation carrying more or less constellation points. To further expand the effective color code space, the present invention adds a parameter called color code extension which in the preferred embodiment can take on one of 6 different values, 6 possibilities for each color code, which gives 96 possibilities. Thus, the sync value combined with the color code extension, defines one of 96 possible values or sets. The present invention can effectively expand the color code space in to a greater or lesser extent, as desired and is not limited to color code extensions having a range of 6 possibilities, or sync values having a range of 16 possibilities.

In prior system arrangements, all slots throughout the system used the same pilot sets. Accordingly, there is no variation in pilot sets from one subscriber to another and from one cell to another. According to certain principles of the present invention, different cells now have different syncs and different pilot sets. Further, the present invention provides an expansion of subscriber identification possibilities. In the preferred embodiment of the present invention, different cells are assigned one out of 16 possible syncs and for each of the 16 syncs, one of six color code extensions are possible. Accordingly, with the preferred embodiment of the present invention 96 different pilot sets are made available. With the present invention, color code information is now associated with the sync symbols of the novel time slot format. The value of the constellation point of the sync symbol itself conveys color code information, due to its mapping with predefined color code values, as mentioned above. In relatively congested areas additional color code information is preferred for practical interference-free operation. As mentioned above, in the preferred embodiment, 16 different syncs are available, with each sync having six possible color code extensions. The present invention, however, can be readily adapted to other numbers of syncs and color code extensions, depending upon the total number of pilot sets required for a given territory, traffic level and other system conditions.

As seen above, in FIGS. 20 and 22, for example, sync values are transmitted in each sub-channel in a block form comprised of a plurality, preferably 3, consecutive symbol positions. Thus, across the sync block of each sub-channel a sync pattern is established. The sync pattern used to encode the time slot incorporates the defined color code value of the preferred, intended or "signal" time slot. Color code values are assigned values taken from an enlarged color code space such that, with a high degree of probability, the time slot information of potential co-channel interferers has different color code values and different sync patterns layered. Thus, the time slot of a potential co-channel interferer is encoded with a different sync pattern than the one expected, and will not be received and the potentially interfering time slot will not be decoded.

As a further precaution, the pilot sets used to encode data units of the payload correspond to different color code values. Even if the same sync is used as expected but the color code extension is different from the one the base expects, it will result in the time slot being sent with the wrong pilot set. When pilot interpolation attempts to use expected ("signal") pilots for interpolation when the time slot was encoded with a different ("interferer") set, the resulting decoded ("interferer") time slot will be completely scrambled. This will result in the class 1 bits failing CRC, the entire ("interferer") time slot being discarded (i.e., the data associated with the time slot is not sent to the system). In this way, expanded multilevel color code functionality is provided while avoiding dedicated symbols to convey color code information. With the present invention, interfering signals are detected and interfering audio (or other data) is discarded appropriately. Accordingly, as seen herein, color code functionality is associated with the decoding results of a limited portion of the data being transmitted, i.e., the class 1 bits of the audio data. If desired, color code failure can be defined according to failed decoding of virtually any information carried in the time slot.

Because interfering signals will have different sync and pilot sets with high probability, the optimal combiner (also known as "smart antenna"—a referenced-based algorithm) can perform better than in previous systems where all subscriber units currently have the same sync and pilot sequences. With the present invention where the interfering signal has different sync and pilot sequences, sufficient time delay between signals is provided to allow the reference-based algorithm to work successfully in a practical environment Advantages of the present invention can be readily applied to the full outbound slot shown in FIGS. 7–10, as well as the split outbound slot shown in FIGS. 11–14 and the full reserved inbound slot shown in FIGS. 15–18. For example, in time slot 500 shown in FIGS. 7–10, dedicated color code symbols 524 can be replaced with data symbols thus increasing slot throughput. The sync symbols 520 can be with newly defined sync symbols which are assigned to different users throughout neighboring cells. The newly defined sync symbols are defined by color code values, and are preferably mapped to color code values, using a look-up table or other conventional techniques. The new sync symbols are further defined according to color code extensions for each sync value. The number of possible sync values and color code extension values can be selected as required to provide sufficient diversity among the users of adjacent cells. Rather than carrying out prior color code checks of data carried in the slot, color code functionality is "automatically" carried out using conventional data error detection techniques. Thus, color code functionality is maintained while not using dedicated color code symbols to convey color code information. Thus, because different sync and pilot sets are provided for each user of a multi-cell region the use of the same sync value but a different color code extension value or the use of a different sync value with an expected color code extension value will result in the data symbols of the slot being encoded with an unexpected pilot set thus resulting in the decoded slot being scrambled, so as to fail conventional data error checking techniques. Similar techniques can be applied to the split outbound slot (FIGS. 11–14) and full reserved inbound slot (FIGS. 15–18) described above.

While the principles of the invention have been described above in connection with a specific apparatus, it is to be clearly understood that this description is made only by way of example and not as a limitation on the scope of the invention.

What is claimed is:

1. A digital time division multiple access communication system comprising:

a time slot comprising four quadrature amplitude modulation sub-channels of pre-selected time duration, each sub-channel time-divided into a plurality of symbol positions;

a plurality of sync symbols in respective sync symbol positions of each sub-channel;

a plurality of pilot symbols in respective pilot symbol positions of each sub-channel with the pilot symbols in one sub-channel timewise staggered with respect to the pilot symbols in an adjacent sub-channel;

a plurality of data symbols in data symbol positions of each sub-channel, located between said pilot symbols in said sub-channel; and a color code defining values of said sync symbols, comprising a color code value mapped to said sync symbols.

2. The system of claim 1 wherein said pilot symbols are defined according to the color code such that pilot interpolation of a time slot of an interfering co-channel transmission having pilot symbols defined according to a different color code results in scrambled erroneous decoded data.

3. The system of claim 1 wherein said sync symbols of each sub-channel include a contiguous series of symbol positions.

4. The system of claim 3 wherein the sync symbols are located at the beginning of the time slot.

5. The system of claim 3 wherein the sync symbols are spaced in time from the beginning of the time slot.

6. The system according to claim 1 wherein the number of pilot symbols in each sub-channel is equal.

7. The system of claim 1 wherein said four sub-channels include a pair of inner sub-channels disposed between a pair of outer sub-channels with the pilot symbols of the inner sub-channels synchronized in time and staggered from the pilot symbols of the outer sub-channel and wherein the number of pilot symbols of the inner sub-channels is different from the number of pilot symbols of the outer sub-channels.

8. The system of claim 1 wherein said pilot symbols of a sub-channel are uniformly spaced apart from one another.

9. The system of claim 8 wherein said four sub-channels include a pair of inner sub-channels disposed between a pair of outer sub-channels with the pilot symbols of the inner sub-channels synchronized in time and staggered from the pilot symbols of the outer sub-channel.

10. The system of claim 1 wherein the sync symbols of the four sub-channels are synchronized in time one with the other.

11. The system of claim 1 further comprising a color code extension parameter for further defining the pilot symbols.

12. The system of claim 11 wherein said pilot symbols are defined according to the color code and the color code extensions parameter, said system further comprising a CRC error detector such that CRC operations performed on data symbols encoded with a different color code or color code extension parameter result in failure of the data symbols to pass the CRC test, thus providing an indication that data in said time slot should be rejected from further processing.

13. The system of claim 1 wherein said data symbols represent data including class 1 voice bits and remaining data and said CRC error detector operates only on the class 1 voice bits.

14. A digital time division multiple access communication system comprising:

a time slot comprising four quadrature amplitude modulation sub-channels of pre-selected time duration, each sub-channel time-divided into a plurality of symbol positions;

a plurality of sync symbols in respective symbol positions of each sub-channel;

a plurality of pilot symbols in symbol positions of each sub-channel with the pilot symbols in one sub-channel timewise staggered with respect to the pilot symbols in an adjacent sub-channel;

a plurality of data symbols in symbol positions of each sub-channel, located between said pilot symbols in said sub-channel; and a color code defining values of said sync symbols, comprising a color code value mapped to said sync symbols with an additional color code extension parameter combined with the color code value.

15. The system of claim 14 wherein said four sub-channels include a pair of inner sub-channels disposed between a pair of outer sub-channels with the pilot symbols of the inner sub-channels synchronized in time and staggered from the pilot symbols of the outer sub-channel.

16. The system of claim 14 wherein the sync symbols of the four sub-channels are synchronized in time one with the other.

17. The system of claim 15 wherein the number of pilot symbols of the inner sub-channels is different from the number of pilot symbols of the outer sub-channels.

18. The system of claim 14 wherein said pilot symbols of a sub-channel are spaced apart from one another by a pre-selected number of data symbols.

19. A digital time division multiple access communication system comprising:

a time slot comprising four quadrature amplitude modulation sub-channels of pre-selected time duration, each sub-channel time-divided into a plurality of symbol positions;

a plurality of sync symbols in respective sync symbol positions of each sub-channel;

a plurality of pilot symbols in respective pilot symbol positions of each sub-channel with the pilot symbols in one sub-channel timewise staggered with respect to the pilot symbols in an adjacent sub-channel;

a plurality of data symbols in data symbol positions of each sub-channel, located between said pilot symbols in said sub-channel; and a color code defining values of said pilot symbols, comprising a color code value mapped to said pilot symbols.

20. The system of claim 19 wherein said pilot symbols are defined according to the color code and a color code extension parameter said system further comprising a CRC error detector such that CRC operations performed on data symbols encoded with a different color code or color code extension parameter result in failure of the data symbols to pass the CRC test, thus providing an indication that data in said time slot should be rejected from further processing.

* * * * *